United States Patent
Furusho

(10) Patent No.: US 7,185,179 B1
(45) Date of Patent: Feb. 27, 2007

(54) ARCHITECTURE OF A PARALLEL COMPUTER AND AN INFORMATION PROCESSING UNIT USING THE SAME

(75) Inventor: Shinji Furusho, Yokohama (JP)

(73) Assignee: Turbo Data Laboratories, Inc., Kanagawa (JP)

( * ) Notice: Subject to any disclaimer, the term of this patent is extended or adjusted under 35 U.S.C. 154(b) by 395 days.

(21) Appl. No.: 10/088,028

(22) PCT Filed: Sep. 1, 2000

(86) PCT No.: PCT/JP00/05947

§ 371 (c)(1),
(2), (4) Date: Mar. 14, 2002

(87) PCT Pub. No.: WO01/22229

PCT Pub. Date: Mar. 29, 2001

(30) Foreign Application Priority Data

Sep. 17, 1999 (JP) .................................. 11/263793

(51) Int. Cl.
*G06F 15/00* (2006.01)
*G06F 12/02* (2006.01)

(52) U.S. Cl. .......................................... 712/214; 712/34
(58) Field of Classification Search .................. 712/28, 712/29, 30, 5, 225, 226, 203, 34, 14; 711/14
See application file for complete search history.

(56) References Cited

U.S. PATENT DOCUMENTS 5,490,260 A * 2/1996 Miller et al. .................. 711/100
5,822,785 A   10/1998 Ikeda et al.
5,829,041 A * 10/1998 Okamoto et al. ........... 711/147

(Continued)

FOREIGN PATENT DOCUMENTS

CA           1121015 A       3/1982

(Continued)

OTHER PUBLICATIONS

John L Hennessy and David A Patterson, Computer Organization and Design the Hardware/Software Interface, 1998, Morgan Kaufmann Publishers, 2nd Edition, pp. 16-18, 541, and 712-713.*

(Continued)

*Primary Examiner*—Eric Coleman
(74) *Attorney, Agent, or Firm*—Griffin & Szipl, P.C.

(57) ABSTRACT

A computer system provides distributed memory computer architecture achieving extremely high speed parallel processing, and includes: a CPU modules, a plurality of memory modules, each module having a processor and RAM core, and a plurality of sets of buses making connections between the CPU and the memory modules and/or connections among memory modules, so the various memory modules operate on an instruction given by the CPU. A series of data having a stipulated relationship is given a space ID and each memory module manages a table containing at least the space ID, the logical address of the portion of the series of data managed, the size of the portion and the size of the series of data, and, the processor of each memory module determines if the portion of the series of data managed is involved in a received instruction and performs processing on data stored in the RAM core.

13 Claims, 23 Drawing Sheets

U.S. PATENT DOCUMENTS 6,226,738 B1 * 5/2001 Dowling .................... 712/225
RE37,305 E * 7/2001 Chang et al. ............... 711/207

FOREIGN PATENT DOCUMENTS

| EP | 0 408 810 A1 | 1/1991 |
|----|--------------|--------|
| JP | 54-56743 | 5/1979 |
| JP | 62-022142 A | 1/1987 |
| JP | 63-316254 A | 12/1988 |
| JP | 06-067846 A | 3/1994 |
| JP | 07-152640 A | 6/1995 |
| JP | 10-143489 A | 5/1998 |
| JP | 11-263793 | 9/1999 |

OTHER PUBLICATIONS

Rosenberg, J , Dictionary of computers, information processing & telecomunications $2^{nd}$ Ed, Pub. James Wiley & Sons 1987 pp. 451.*
European Search Report, Nov. 21, 2002 date of completion.
Ananthanarayanan R et al, "Experiences in Integrating Distribution Shared Memory With Virtual Memory Management" Operating Systems Review (SIGOPS), ACM Headquarter, New York, US, vol. 26, No. 3, Jul. 1, 1992, pp. 4-26.
Joho Shori, vol. 32, No. 12, Dec. 1991, "Kinou Memory ni yoru Chou Heiretsu Shori", Hitoro YASUURA, pp. 1260-1267.

* cited by examiner

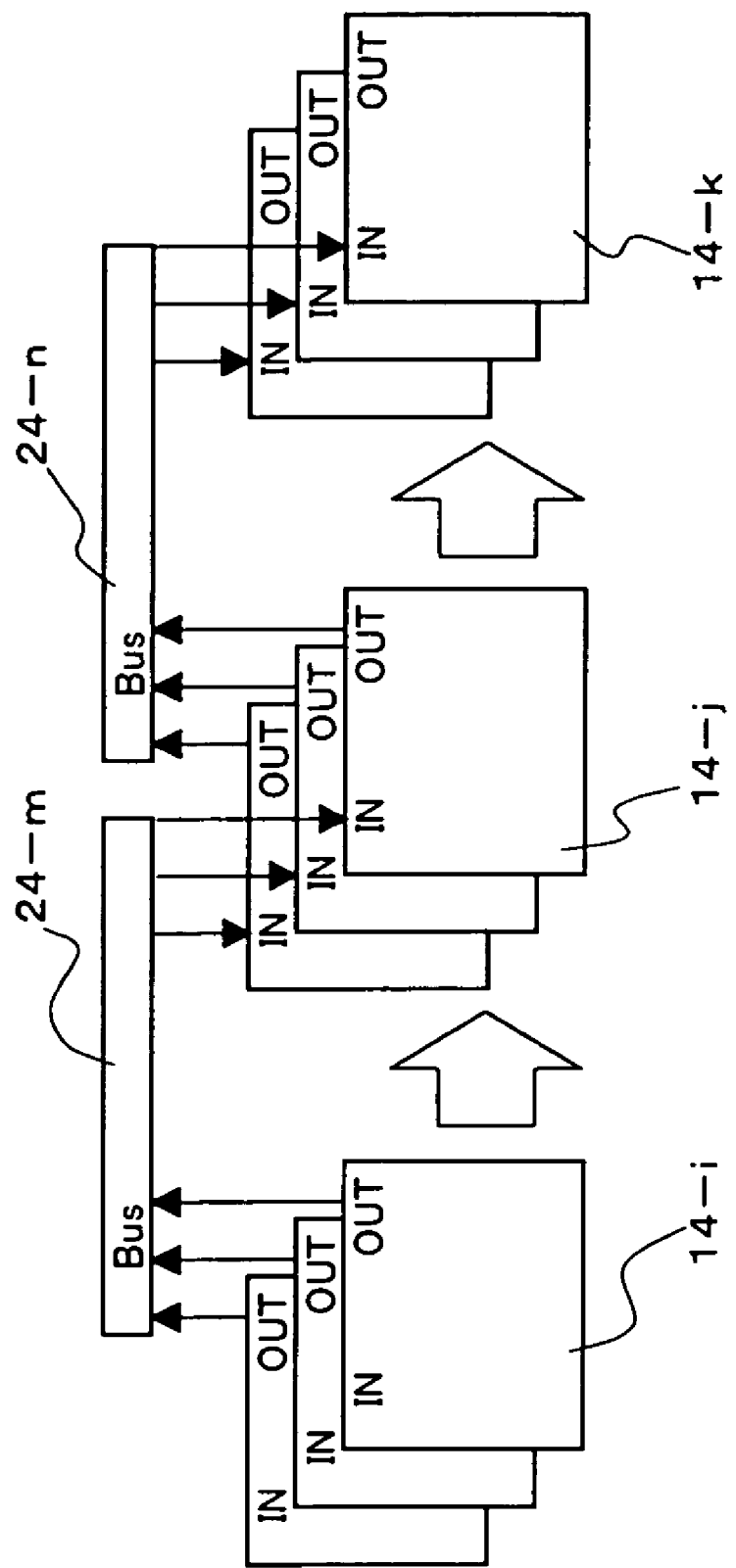

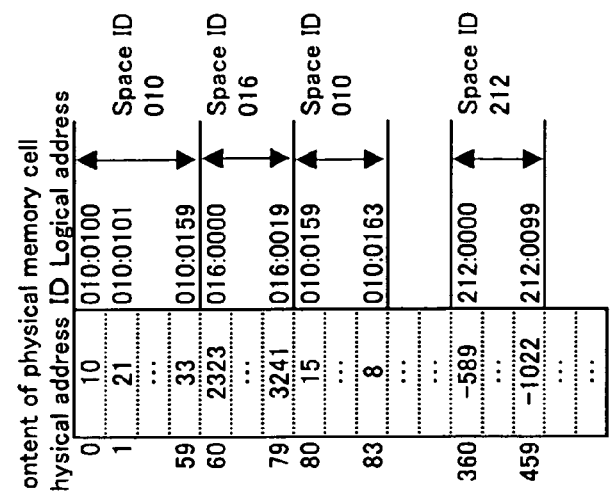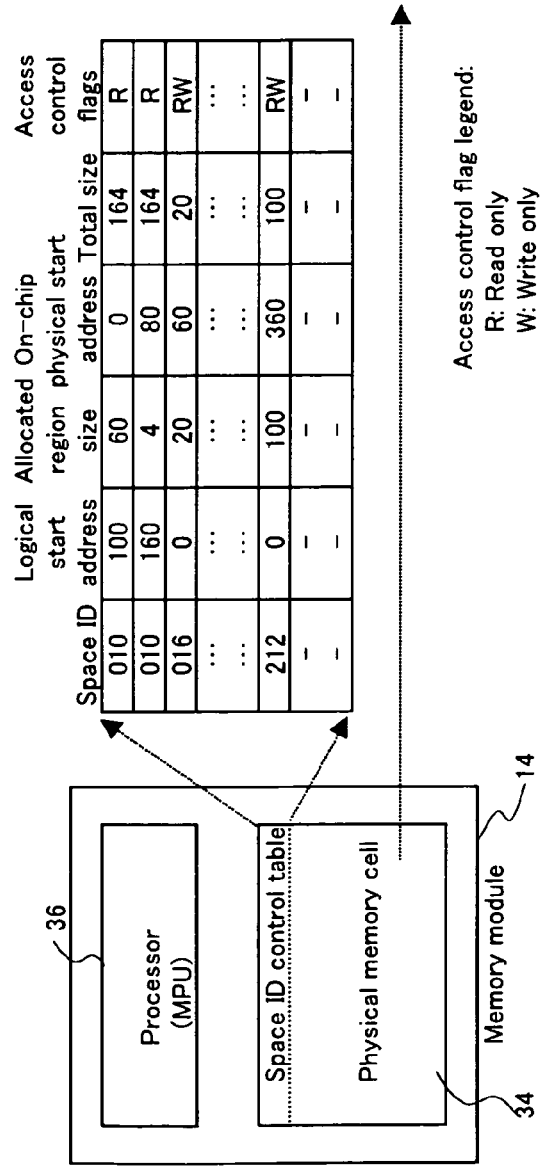

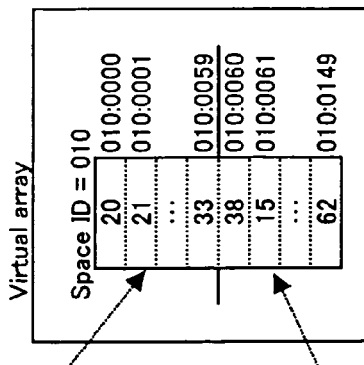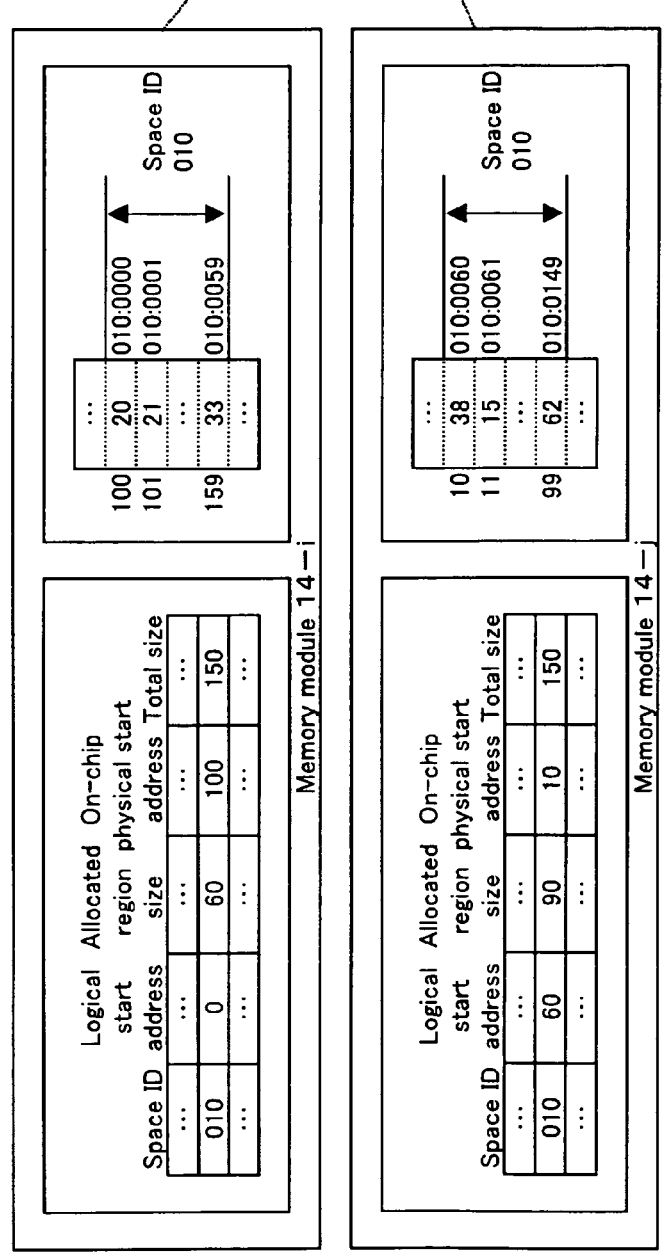

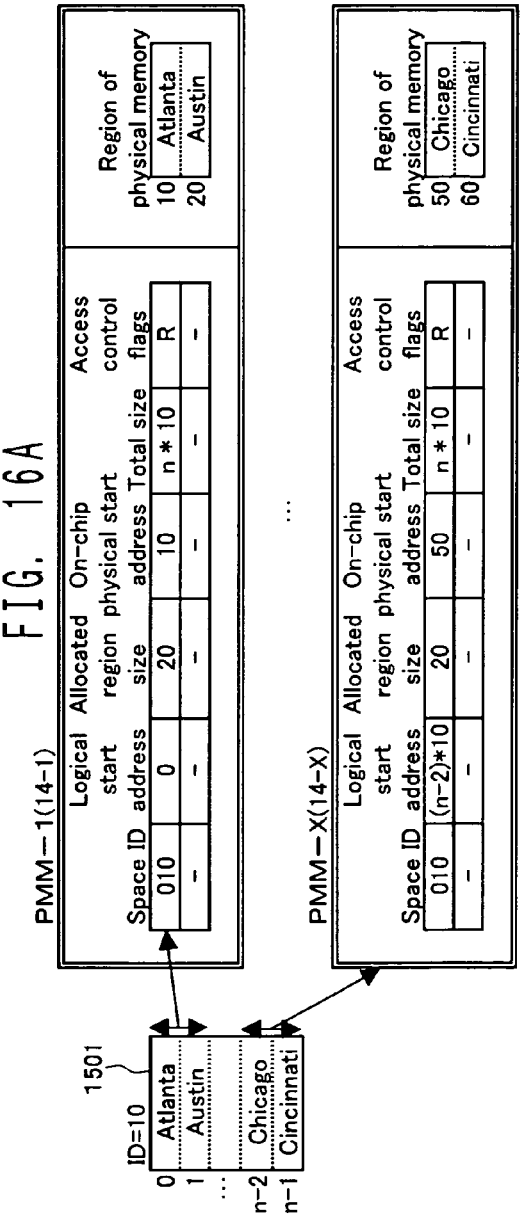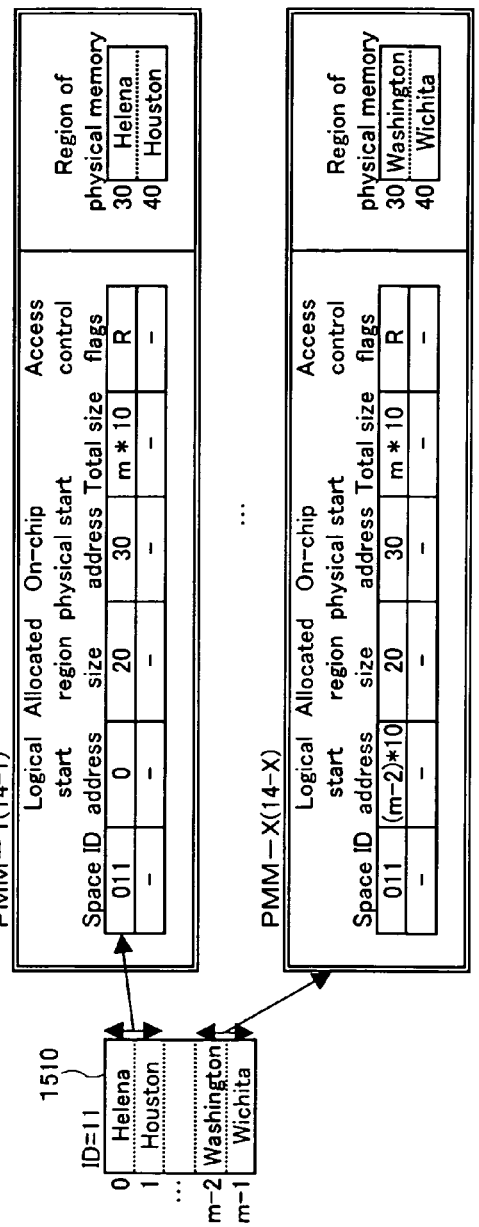

ARCHITECTURE OF A PARALLEL COMPUTER AND AN INFORMATION PROCESSING UNIT USING THE SAME

This is a National Phase Application in the United States of International Patent Application No. PCT/JP00/05947 filed Sep. 1, 2000, which claims priority on Japanese Patent Application No. 11-263793, filed Sep. 17, 1999.

BACKGROUND OF THE INVENTION

1. Field of the Invention

The present invention relates to a parallel computer architecture able to implement an SIMD (Single Instruction Stream, Multiple Data Stream) architecture, and more specifically relates to a computer architecture that is able to perform general-purpose parallel processing by means of appropriate and high-speed memory control.

2. Description of the Prior Art

Now that computers have been introduced into many aspects of society in its entirety and the Internet and other networks have become pervasive, data is being accumulated on a large scale. Vast amounts of computing power is required in order to process data on such large scales, so attempts to introduce parallel processing are natural.

Now, parallel processing architectures are divided into "shared memory" types and "distributed memory" types. The former ("shared memory" types) are architectures wherein a plurality of processors shares a single enormous memory space. In this architecture, traffic between the group of processors and the shared memory becomes a bottleneck, so it is not easy to construct practical systems that use more than 100 processors. Accordingly, at the time of calculating the square roots of 1 billion floating-point numbers, for example, processing can be performed no faster than 100 times the speed of a single CPU. Empirically, the upper limit is found to be roughly 30 times.

In the latter ("distributed memory" types), each processor has its own local memory and these are linked to construct a system. With this architecture, it is possible to design a hardware system that incorporates even several hundred to tens of thousands of processors. Accordingly, at the time of calculating the aforementioned square roots of 1 billion floating-point numbers, processing can be performed several hundred times to tens of thousands of times the speed of a single CPU. However, the latter also has several problems as will be described later.

The present invention pertains to the "distributed memory" type, so we shall make comparisons with the prior art while first adding some description of this architecture.

[Problem 1: Division of Management of Large Arrays]

The first problem with "distributed memory" type architectures is the problem of the division of management of data.

Huge amounts of data (typically consisting of arrays, so hereinafter we shall describe it in terms of arrays) cannot be stored in the local memory belonging to a single processor, so it must be managed by division among a plurality of local memories by necessity. It is evident that an effective and flexible division of management mechanism must be introduced or this will bring various obstacles to the development and execution of programs.

[Problem 2: Poor Efficiency of Interprocessor Communication]

When the various processors in a distributed memory type system are to access huge arrays, while each processor can quickly access the array elements in the local memory, interprocessor communication becomes vital for accessing array elements belonging to other processors. This interprocessor communication has extremely low performance in comparison to communication with local memory, being said to require a minimum of 100 clock cycles. For this reason, performance is extremely degraded during the implementation of sorting because lookups are performed over the entire scope of a huge array and thus interprocessor communication occurs frequently.

Here follows a detailed description of this problem. As of the year 1999, personal computers use between one and several CPU's in a "shared memory" type architecture. The standard CPU used in these personal computers operates with an internal clock speed roughly 5-6 times that of the memory bus, being equipped with automatic internal parallel execution functions and pipeline processing functions so that one piece of data can be processed in roughly one clock cycle (memory bus).

When a sort process is performed on a huge array in a "shared memory" type personal computer, one clock cycle is required for one piece of data, so it is thought to achieve 100 times the performance of a "distributed memory" type multiprocessor system that requires 100 clock cycles (memory bus) for one piece of data.

[Problem 3: Supply of Programs]

The third problem with the "distributed memory" type architecture is the problem of how programs are to be supplied to the plurality of processors.

In an architecture wherein programs are loaded separately to an extremely large number of processors and the whole is operated cooperatively (MIMD: Multiple Instruction Stream, Multiple Data Stream), the creating, compiling and distributing of programs poses a major burden.

On the other hand, in an architecture wherein many processors are operated with the same program (SIMD: Single Instruction Stream, Multiple Data Stream), the degree of freedom in programming is reduced, so situations in which programs that give the desired results cannot be developed are also conceivable.

The present invention provides a method and computer architecture for solving Problems 1 through 3 with the "distributed memory" type described above. Problem 1 with the division of management of large arrays can be solved by the division of management with a method in which the layout (physical addresses) of various elements within the array is uniform within the various processor modules. By means of this technique, the need for garbage collection is eliminated, the insertion or deletion of array elements is completed in several clocks, and the implicit (non-explicit) division of processing by the various processors essential for the implementation of SIMD can be allocated. This method will be described later by the concept of "multi-space memory."

Problem 2 with the poor efficiency of interprocessor communication can be solved by reconnecting the various processors depending on the processing that is to be achieved, and performing one-directional continuous transfer of stipulated types of data in a stipulated order on each connection route, thereby scheduling communication so that nearly 100% of the capacity of the bus can be used, and simultaneously achieving massively parallel pipeline processing.

In order to demonstrate its effectiveness, we shall later present an example of a method of constructing a system wherein a sort of 1 billion records is completed in roughly one second in a realistic system design. This is more than 100,000 times the speed of the fastest known device. This method will be described later as "bus reconfiguration."

Problem 3 with the "supply of programs" can be solved by adopting the SIMD scheme. In the case of SIMD, the largest problem is how to solve the implicit (non-explicit) division of processing among the various processors, but this problem of division of processing can be solved automatically with the aforementioned "multi-space memory" technique, so the degree of freedom of programming can be kept even with SIMD.

To wit, the present invention has as its object to provide a distributed memory type computer architecture wherein the input/output of elements within an array stored in various types of memory can be performed with a single instruction, and extremely high-speed parallel processing is achievable.

SUMMARY OF THE INVENTION

The object of the present invention is achieved by the architecture of a parallel computer comprising: a CPU module, a plurality of memory modules, each of which having a processor and RAM core, and a plurality of sets of buses that make connections between said CPU and memory modules and/or connections among memory modules, wherein the processors of the various memory modules operate on an instruction given by the CPU to the processors of the various memory, and wherein said architecture of a parallel computer is constituted such that: a series of data having a stipulated relationship is given a space ID and the processor of each memory module manages a table that contains at least said space ID, the logical address of the portion of the series of data that it manages itself, the size of said portion and the size of the series of data, and, the processor of each memory module determines if the portion of the series of data that it manages itself is involved in a received instruction, reads data stored in the RAM core and sends it out on a bus, writes data given via the bus to the RAM core, performs the necessary processing on the data, and/or updates said table.

By means of the present invention, a series of data can be addressed using a space ID and even if said series of data is divided among many memory modules, the processor of each memory module can reliably recognize said series of data. In addition, a memory module uses a table to address the series of data and the portions thereof it manages by itself, so that upon receipt of instructions, the stipulated processing can be executed by looking up that table. Thereby, parallel processing among the various processors can be achieved based upon a single instruction.

In a preferred embodiment of the present invention, the processor has: a space comparator that compares the space ID given by the CPU against the space ID of one or more series of data that it manages itself, an address comparator that compares the logical address given by the CPU against the logical address of the portion of the data that it manages itself, and an address calculator that calculates the physical address in its own RAM cell based on said logical address. These comparators and calculators may be constituted in hardware or they may be implemented in software by programming the processor.

In addition, in another preferred embodiment of the present invention, each of said memory modules receives a synchronization signal for achieving, synchronization with the CPU module and other memory modules, and it is constituted such that it comprises input that is connectable to any of said plurality of sets of buses, and output that is connectable to any other of said plurality of sets of buses, and at least, it is able to output data according to said synchronization signal by connecting the input to one of said buses, inputting data and connecting the output to any of said other buses.

By means of this embodiment, data output from the memory modules and data input to the memory modules are performed according to the synchronization signal, and also, it is possible to achieve parallel processing appropriately by controlling the bus connections.

It is even more preferable if switches are provided on each of said sets of buses, thereby controlling the connections between said CPU module and the input or output of any of the memory modules, and/or between the input and output of one memory module and the output and input of another memory module, and by switching said switches, the exchange of parallel data is achieved in each of said sets of buses. Thereby, the plurality of sets of buses can be used even more effectively and parallelism can be increased even further.

In a further preferred embodiment of the present invention, the output of one memory module is connected to the input of another memory module via a first bus which is one of said plurality of sets of buses, and the output of said other memory module is connected to the input of still another memory module via a second bus which is another one of said plurality of sets of buses, so that the exchange of data over the first bus proceeds in parallel with the exchange of data over the second bus. In this manner, by means of this embodiment of the computer, it is possible to achieve pipeline processing by means of the CPU module and memory module. It is even more preferable for the connections between said bus and memory module to be repeated to form multi-stage connections among memory modules.

In another preferred embodiment of the present invention, when said processor receives an instruction to delete a specific element within a series of data, insert a specific element into said series of data, or add a specific element to the end of a series of data, said processor performs a table lookup, compares the region of data that it manages itself against the position of said element subject to deletion, insertion or addition, and based on the results of said comparison, updates the content of said table. To wit, the processor updates the tables that it manages itself; to wit, the deletion, insertion and addition of elements can be achieved by remapping.

In still another embodiment of the present invention, in response to a given instruction, said processor converts subscripts for specifying elements within a series of data, and/or executes value conversion for giving a specific modification to elements.

In addition, the object of the present invention may also be achieved by an information processing unit comprising: a CPU module, a plurality of memory modules, each of which having a processor and RAM core, and a plurality of sets of buses that make connections between said CPU and memory modules and/or connections among memory modules, wherein the processors of the various memory modules operate on an instruction given by the CPU to the processors of the various memory, and wherein said information processing unit is constituted such that: a series of data having a stipulated relationship is given a space ID and the processor of each memory module manages a table that contains at least said space ID, the logical address of the portion of the series of data that it manages itself, the size of said portion and the size of the series of data, and, the processor of each memory module determines if the portion of the series of data that it manages itself is involved in a received instruction, reads data stored in the RAM core and sends it out on a bus, writes data given via the bus to the RAM core, performs the necessary processing on the data, and/or updates said table.

Moreover, the object of the present invention is also achieved by a computer system comprising the aforementioned information processing unit and one or more storage devices including legacy memory, input devices and display devices linked to the CPU module via another bus.

BRIEF EXPLANATION OF THE DRAWINGS

This and other objects of the present invention will be made clear in reference to the appended drawings and embodiments. Here:

FIG. 7 is a schematic diagram of pipeline processing among memory modules according to this embodiment.

FIGS. 8A to 8C are diagrams used to describe the structure of a memory module 14 under a multi-space memory according to this embodiment.

FIGS. 10A to 10C are diagrams used to describe the structure of a memory module 14 under a multi-space memory.

FIGS. 16A and 16B are diagrams showing the state of an array having a space ID of "10" and an array having a space ID of "11" in this embodiment, along with them stored in a memory module.

DESCRIPTION OF THE PREFERRED EMBODIMENT

[Hardware Configuration]

Figure 1:
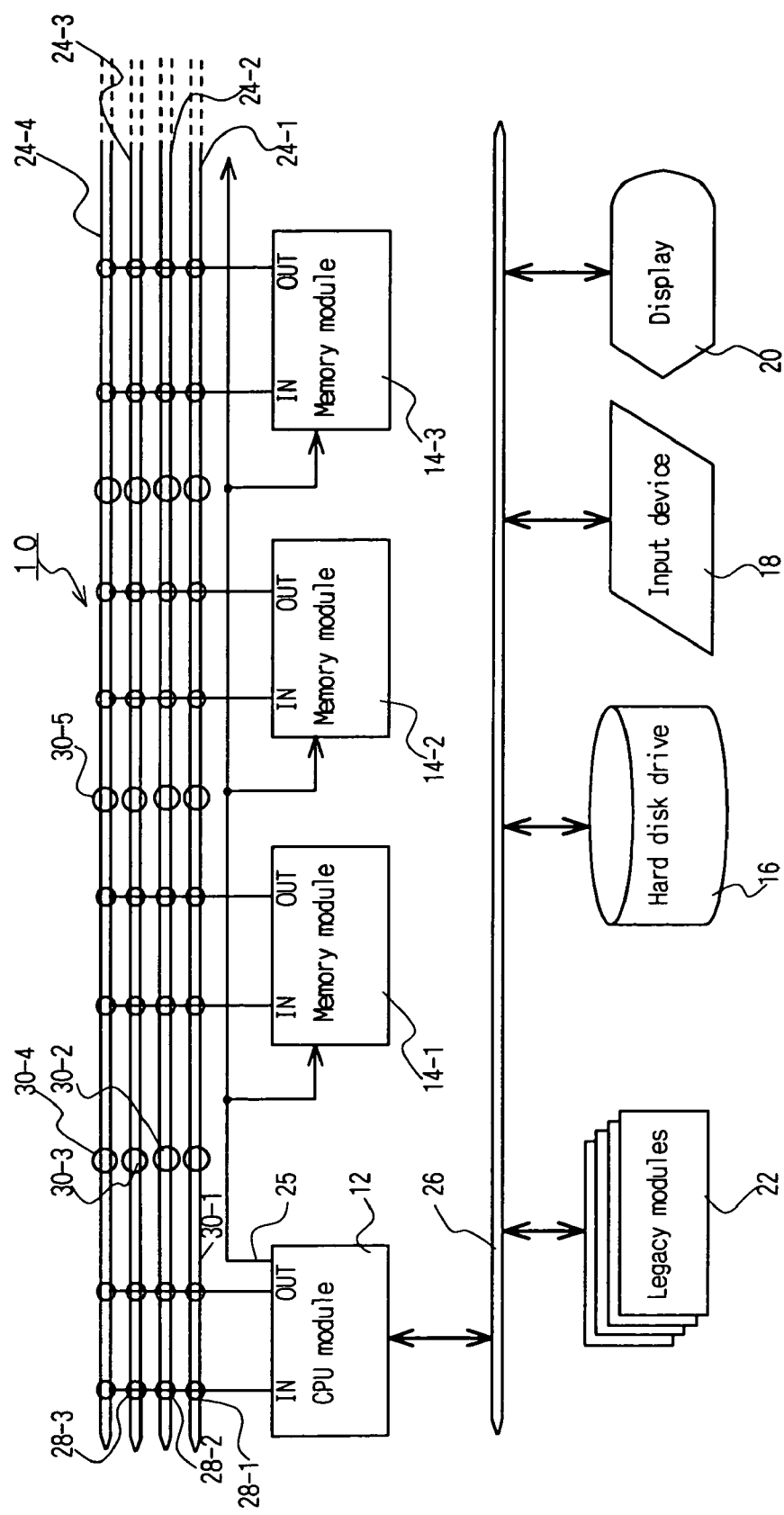
FIG. 1 is a block diagram showing the configuration of a computer system according to an embodiment of the present invention.

Here follows a description of the embodiments of the present invention made with reference to the appended drawings. FIG. 1 is a block diagram showing the configuration of a computer system according to an embodiment of the present invention. As shown in FIG. 1, a computer system 10 comprises a CPU module 12 that performs parallel operations based on a single instruction, memory modules 14-1, 14-2 and 14-3 that store various types of data required for parallel operations, a hard disk drive 16 that stores required programs and data, a keyboard, mouse or other input device 18, display 20 consisting of a CRT or the like and legacy memory 22 that stores data and the like in various formats. In addition, on buses 24-1, 24-2 . . . , switches 28-1, 28-2, 28-3, . . . and the like are placed at points of contact with the various memory modules 14, so the selected circuit elements are able to exchange information. In addition, switches 30-1, 30-2, . . . are provided between the CPU module 12 and memory module 14-1 to make bus links and connections among adjacent memory modules. Note that in the drawings appended to this Specification, the memory modules may be indicated by "PMM" for convenience.

A plurality of buses 24-1, 24-2, 24-3, 24-4, . . . is provided between the CPU module 12 and the memory modules 14. Accordingly, data and the like can be exchanged among the memory modules by means of the aforementioned buses. In addition, a signal control line 25 is provided between the CPU 12 and the memory modules 14, so that instructions issued by the CPU 12 are transmitted to all of the memory modules 14.

Moreover, a local bus 26 is provided between the CPU 12 and various other constituent elements (e.g., the hard disk drive 16, input device 18, etc.), so data and the like can also be exchanged among them also. The CPU 12 reads a program stored on the hard disk drive 16 or RAM or other storage devices (not shown) connected to the local bus 26, and follows this program to execute the sending of instructions to the memory modules 14 and other exchanges of data, along with control of the switches 28, 30 and the like. In addition, in accordance with the program, the CPU 12 accepts data in various formats stored in legacy memory 22, converts this formatted data to a series of data (array) that can be processed by the system consisting of the CPU 12, memory modules 14 and bus 24, and stores this in the various memory modules 14.

Figure 2:
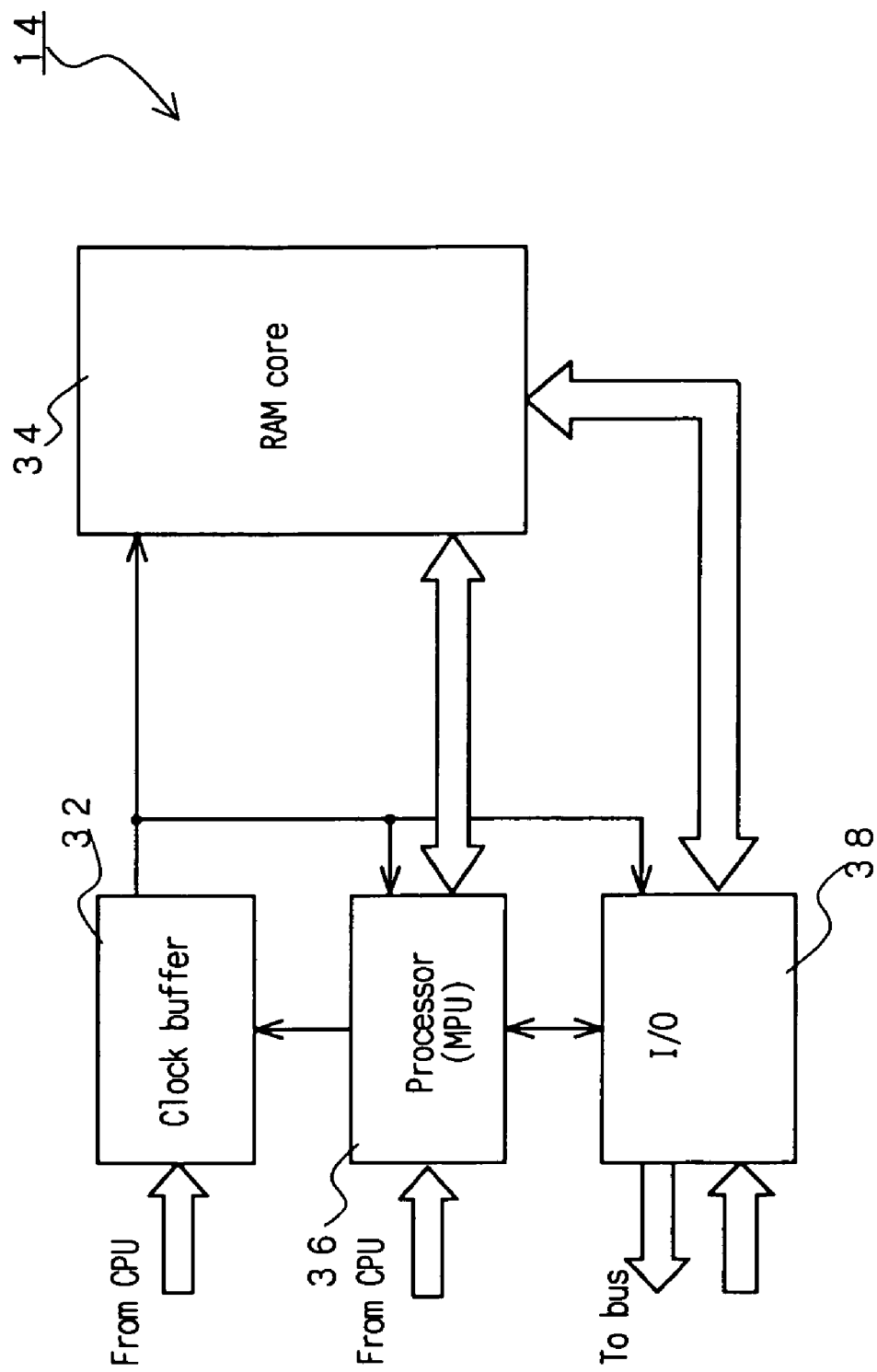
FIG. 2 is a schematic block diagram showing a memory module according to this embodiment.

FIG. 2 is a schematic block diagram showing a memory module 14 according to this embodiment. As shown in FIG. 2, the memory module 14 consists of a clock buffer 32 that accepts clock and other synchronization signals given by the CPU module 12, a RAM core 34 that stores data, a processor (MPU: memory processing unit) 36 that recognizes the space ID and element numbers of data (to be described later), and upon accepting an instruction or the like from the CPU 12, writes data to the RAM core 34 or reads data from the RAM core based on the space ID and element number, and an I/O unit 38 that receives data from one of the buses and supplies it to the RAM core 34, and/or sends data from the RAM core 34 and sends it out on one of the buses. In this embodiment, the memory module 14 is able to receive instructions from the CPU via the signal control line 25, respond to these instructions and perform the reading of data from the RAM core 34, writing of data to the RAM core 34 or perform other stipulated processing on data. In addition, data access to the RAM core 34, and data input and data output via the I/O unit are executed based on a clock or other synchronization signal given by the clock buffer 32.

As is clear from FIG. 1 and FIG. 2, in the present invention, the computer system 10 may be thought of as a shared memory type system. In addition, as described later, processing is executed in parallel by the various memory modules 14 by giving instructions to the memory modules 14 via the signal control line 25. In addition, data output to the bus and data input from the bus and the like are executed based on stipulated synchronization signals. Accordingly, this computer system 10 may be considered to take the form of a SIMD system.

[Overview of Implemented Functions]

Before presenting a detailed description of a computer system 10 that has such a configuration, we shall briefly describe an overview of the functions implemented by this computer system 10.

(1) Multi-Space Memory

In this Specification, a "multi-space memory" refers to a memory wherein the memory space is allocated such that it is accessed based on a space ID and address. Thereby, even when a series of data is divided among many processors, each processor is able to separate and recognize it reliably.

In the conventional memory space, even if separate regions are allocated for each process, the allocation of memory space was not performed for each series of variables (arrays, structures, etc.). Accordingly, such a conventional memory space is described in the following as a "single memory space." In a system with a single memory space, data access is performed using only the address, so it was not possible to separate or recognize a series of associated data. For this reason, even if parallel processing is actually possible, there are many cases in which this cannot be determined. In addition, when a new series of data is stored in a certain single memory space, it was necessary to perform garbage collection in order to secure a place to store the series of data in question.

In contrast, in the present invention, a space ID is introduced into the memory space, thereby applying the same ID to a series of data. In addition, each of the memory modules 14 recognizes the space ID for the data kept in its own RAM core 34, and thereby each memory module 14 is able to determine whether or not it needs to operate by looking up the space ID of the data currently being accessed. In addition, because each memory module 14 can keep all or some of a series of data associated with a space ID, it is possible to store a certain series of data divided among a plurality of memory modules 14, and thereby garbage collection becomes unnecessary.

Figure 3:
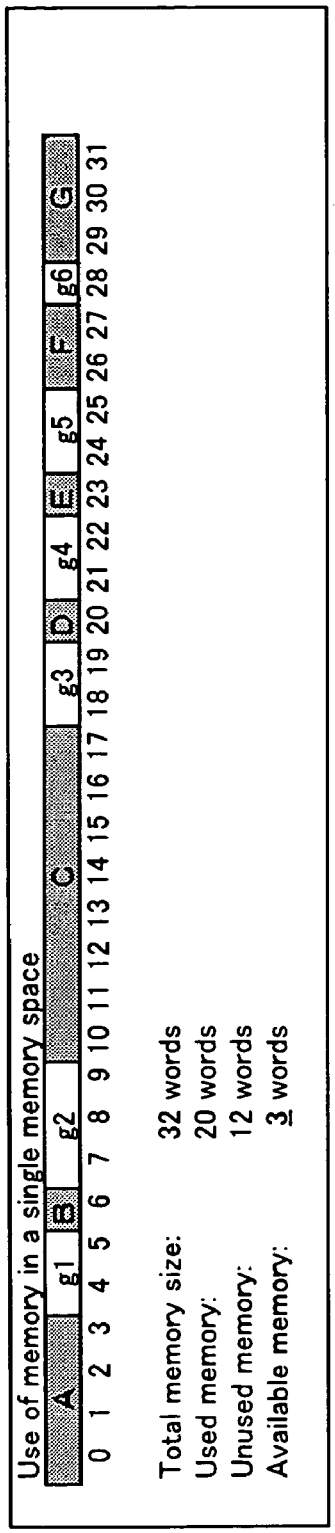
FIG. 3 is a diagram showing the arrangement of a series of data in a single memory space.
Figure 4:
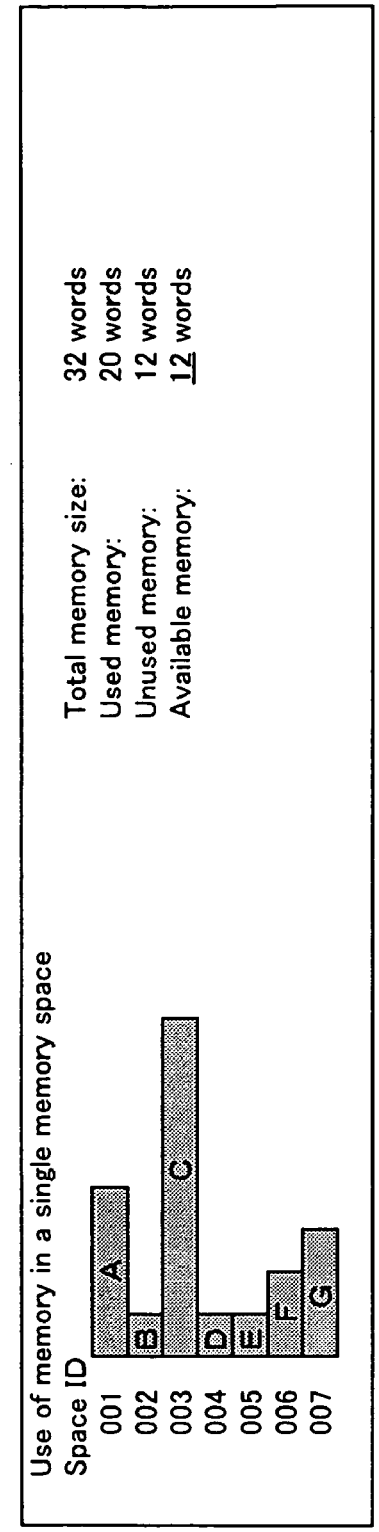
FIG. 4 is a diagram showing the arrangement of a series of data in a multi-space memory according to the present invention.

For example, as shown in FIG. 3, consider the case wherein the "A" series of data "B" series of data, . . . are stored in a single memory space. Assume, for example, the total memory size is 32 words, and the total size of the aforementioned series of data is 30 words. Because these series of data are scattered throughout the space, even though there is 12 words of unused memory, the largest series of data that can actually be stored is limited to 3 words. For this reason, in order to store a new series of data that is larger than 3 words in size, it is necessary to perform garbage collection. On the other hand, with the present invention, a space ID is applied to each series of data. These are stored in one or more memory modules 14 associated with the space ID. Accordingly, the amount of unused memory can be made to match the amount of available memory.

(2) Memory Modules

In addition, in the present invention, each of the memory modules 14 has a processor 36 that recognizes the individual element numbers of the series of data that it keeps itself. Accordingly, upon accepting an instruction from the CPU 12, the processor 36 is able to determine whether the data to be accessed according to the instruction is kept within its own RAM core 34 or not and thereby determine whether access is necessary or not. Moreover, each of the memory modules 14 is able to determine from the range of subscripts in the array elements stored in its own RAM core 34 the range of the burden of implicit processing in instructions under SIMD.

Figure 5:
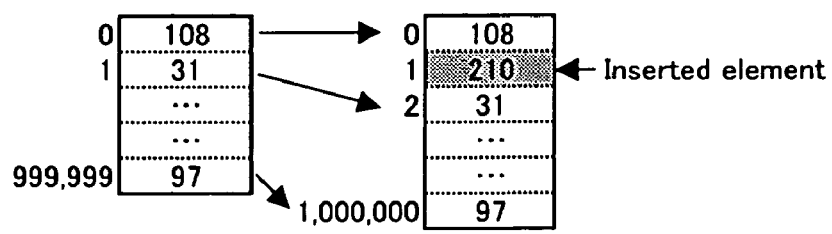
FIG. 5 is a diagram used to describe address mapping according to this embodiment.
Figure 6:
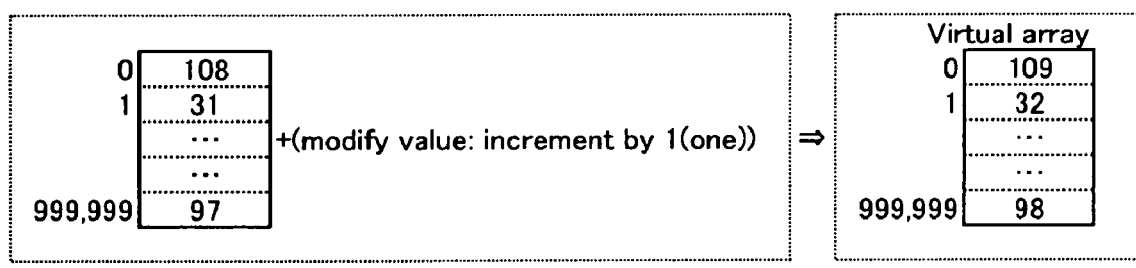
FIG. 6 is a diagram used to describe value modification according to this embodiment.

In addition, in the present invention, the memory module 14 is able to perform address remapping. For example, as shown in FIG. 5, when a certain element is inserted at a stipulated position in a certain array, or when an element at a stipulated position is to be deleted, or a stipulated element is added to the end of an array, according to this embodiment, this can be performed quickly in parallel by the processor 36 performing address remapping on each of the memory modules that keeps elements associated with the array in question. Moreover, as shown in FIG. 6, when array elements (values) are modified (for example, when "1" is added to each value), the processor 36 can perform the required processing quickly and in parallel on each of the memory modules that keeps associated array elements.

In addition, in the memory modules 14, the processor 36 can determine the size of the data to be stored in the RAM core 34, and store it in compressed form. For example, in the event that integer-value data is to be kept in a certain memory module 14, but the actual data values can contain only values in the range from 0 to 3, then the processor 36 prepares only 2 bits to store each data value. In the event that 32 bits are used to represent one integer on the bus with the CPU 12, then in order to perform communication between the memory module 14 and the CPU 12, it is sufficient for the processor 36 to change the data format and then perform the exchange with the CPU 12. Thereby, RAM core 34 can be utilized fully without waste. In addition, text strings or other types of variable-length data can also be similarly stored by changing the data length.

Moreover, in the memory modules 14, it is possible to set a specific value (e.g., "0") to data associated to a stipulated space ID or data assigned element numbers in a stipulated range. Thereby, it is possible to perform the initialization process quickly within the memory module 14. In addition, it is possible to search for values within specific data (arrays) or check the range of subscripts.

(3) Reconfigurable Bus

With the present invention, the CPU 12 is able to selectively turn on/off switches 28-1, 28-2, . . . and switches 30-1, 30-2, . . . , and thus specify the memory module 14 with which data is to be exchanged, thereby achieving pipeline processing. For example, as shown in FIG. 7, if data output from a certain memory module 14-*i* is to be given to another memory module 14-*j*, and data output from this other memory module 14-*j* is to be transferred to yet another memory module 14-*k*, then the CPU 12 sets the states of the various switches so that bus 24-*m* is allocated to memory modules 14-*i* and 14-*j* and bus 24-*n* is allocated to memory modules 14-*j* and 14-*k*.

Moreover, this pipeline processing can be achieved not only in the case of connections among single memory modules, but it can also be achieved by connections among a plurality of series of memory modules (memory module groups). Depending on the processing to be achieved, the various memory modules can be reconnected so that it is possible to perform one-directional continuous transfer of stipulated types of data in a stipulated order on each connection route, thereby scheduling communication so that nearly 100% of the capacity of the bus can be used. Thereby, the poor performance of interprocessor communication which is the greatest problem of distributed memory type parallel processing systems can be solved.

In a computer system 10 having such a constitution, here follows a description of the specific constitution of the multi-space memory and the operation of the system in the multi-space memory.

[Multi-Space Memory]

FIGS. 8A to 8C are diagrams used to describe the structure of a memory module 14 under a multi-space memory according to this embodiment. As shown in FIG. 8A, a space ID control table is provided in the RAM core 34 within the memory module 14. Thereby, the processor 36 of the memory module 14 can determine the space ID of the data kept by itself and other necessary information.

As shown in FIG. 8B, the space ID control table contains, for each group of data it keeps, the space ID, the logical start address under CPU control, the size of the region allocated to the data group, the physical start address within RAM core 34, the total size of the series of data having the space ID in question, and access control flags that control access. In this embodiment, the access control flags can be set to one of the three states of read only (R), write only (W) or read/write enabled.

When given a data group having a certain space ID, the processor 36 of the memory module 14 finds one or more regions in the RAM core 34 where the data group in question is to be stored and stores the data group in said regions as is or divided into two or more parts. At this time, the logical start address within the RAM core where the data is actually stored and the allocated region size are stored in the space ID control table together with the given space ID, logical start address, total size and access control flags. FIG. 8C is a diagram showing the data stored within the RAM core 34 according to the space ID control table of FIG. 8B.

[Brief Discussion of Memory Access]

Figure 9B:
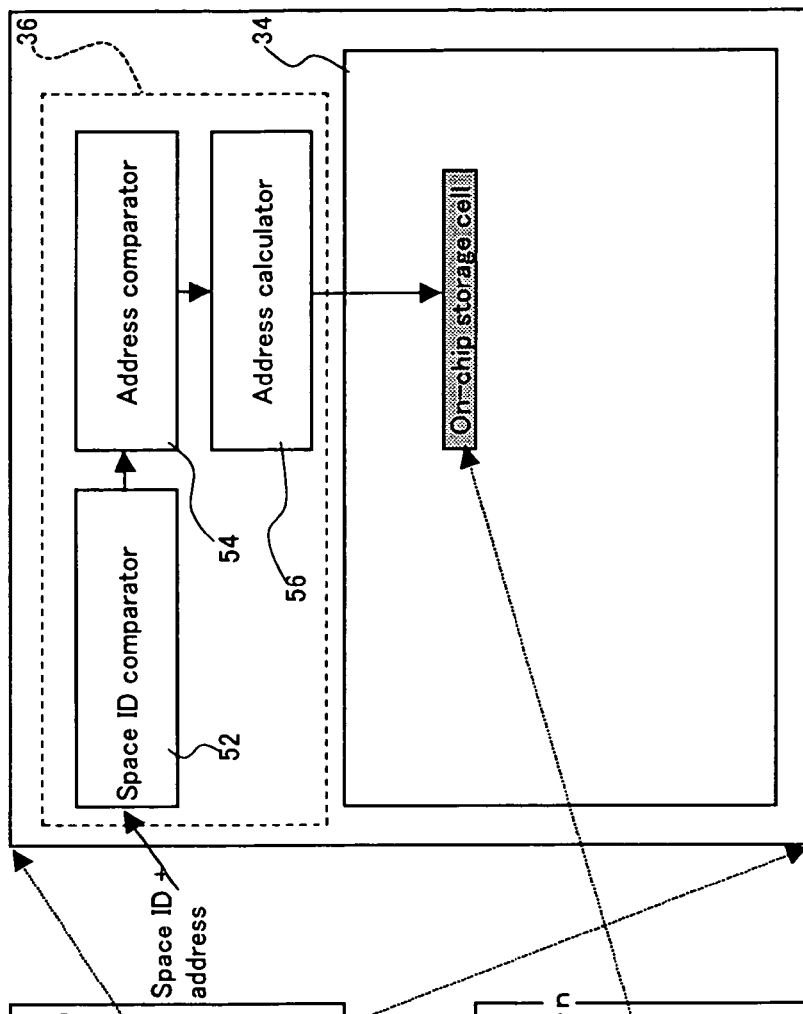
FIGS. 9A to 9C are diagrams used to describe the structure of a memory module 14 under a multi-space memory.
Figure 9A:
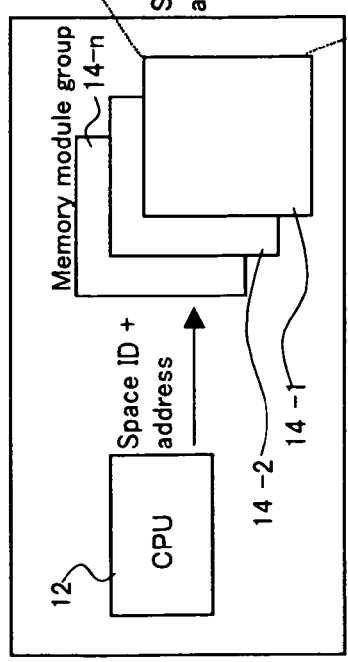
Figure 9C:
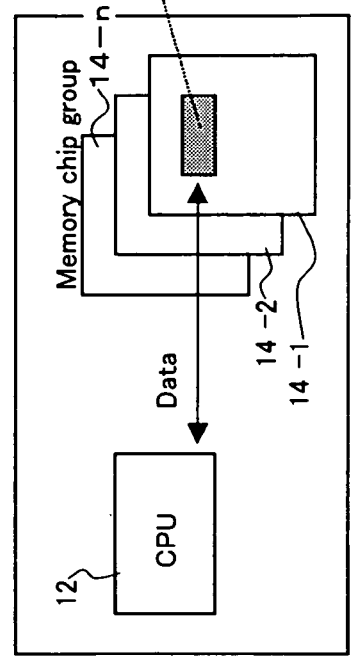

Here follows a description of accessing a memory module 14 having such a constitution. As shown in FIGS. 9A to 9C, the CPU 12 first transmits the space ID, logical address and required instruction (e.g., read or write data) to all memory modules 14 via the signal control line 25. In response, each of the memory modules 14 uses the space comparator 52 provided in the processor 36 to compare the space ID against the space ID's kept in its own space ID control table, and determine if the same one is kept by itself. Also, the address comparator 54 performs the same type of determination regarding the logical address. Next, if the data subject to the instruction is determined to be kept within its own RAM core 34, the processor 36 of the memory module 14 uses an address calculator 56 to look in the space ID control table to calculate the physical address within RAM core 34 and identify the data subject to processing.

Once the data is identified in this manner, the processor 36 executes the processing corresponding to the instruction given by the CPU 12 (e.g., read or write data), and if necessary, transmits the data to the CPU 12 (see FIG. 9C).

[Specific Operations with Multi-Space Memory: Delete Array Elements, etc.]

Here follows a description of an example of a series of operations going from the state wherein a series of data (hereinafter referred to an "array" in certain cases) having a certain space ID is stored in one or more memory modules 14 to the state wherein a specific element is deleted.

Consider the case wherein a data group belonging to the space ID "010" is stored in a certain memory module 14-*i* as shown in FIG. 10A, and a data group belonging to the space ID "010" is stored in another memory module 14-*j* as shown in FIG. 10B. For example, one can see that in memory module 14-*i*, data at the logical addresses from "0" to "59" is stored starting at the physical address of "100" of that RAM core. In this case, the virtual array is as shown in FIG. 10C.

Figure 11:
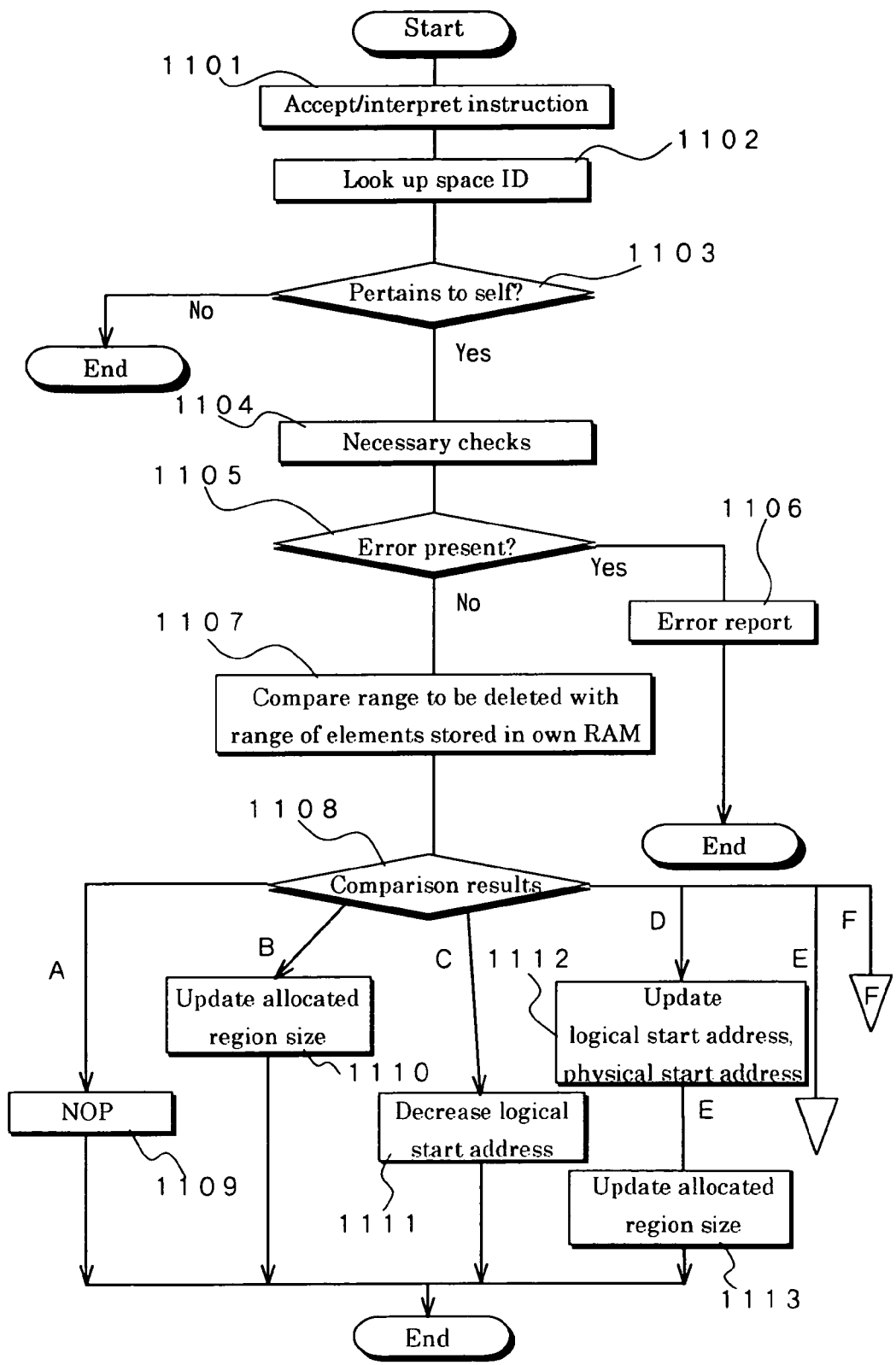
FIG. 11 is a flowchart showing the process executed in the various memory modules upon receiving an instruction to delete a stipulated range of elements within a certain space ID.
Figure 13:
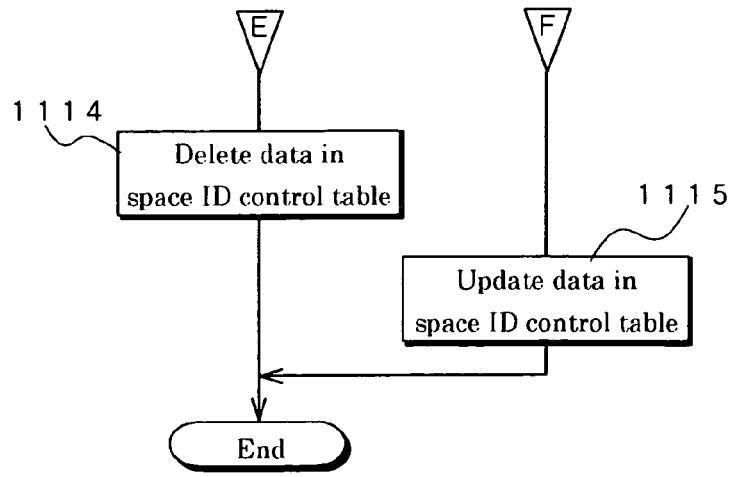
FIG. 13 is a flowchart showing the process executed in the various memory modules upon receiving an instruction to delete a stipulated range of elements within a certain space ID.

Here follows a description of the process of deleting a specific element when a certain array is stored in a plurality of memory modules in this manner. Consider the case in which an instruction to delete the elements 50 through 59 of the space ID "010" is issued from the CPU 12 via signal control line 25. FIGS. 11 and 13 are flowcharts that show the process in the case in which an instruction to delete elements in a stipulated range within a certain space ID is received and executed on the various memory modules.

The processor 36 of each memory module receives the instruction given via the signal control line 25, interprets the content (Step 1101), examines the "space ID" within the instruction (Step 1102), and makes the judgment as to whether the data kept in its own RAM core 34 is associated with the space ID (Step 1103). If the result of Step 1103 is No, processing ends. If the result is Yes, the processor 36 looks into the space ID control table and determines whether the data group pertaining to the space ID in question is writeable or not, and if the size of the range to be deleted is smaller than the entire size or not (Step 1104). If the checks detect an error (Yes in Step 1105), then the processor 36 reports via the signal control line 25 that an error has occurred. On the other hand, if no error is present, the processor 36 compares the range requested to be deleted by the instruction against the range of elements kept in its own RAM core 34 (Step 1107), and various processes may be executed depending on the results of this comparison (Step 1108).

Figure 12A:
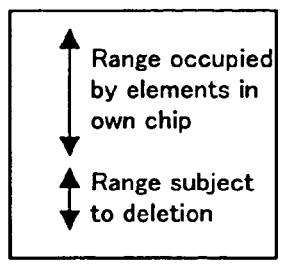
FIGS. 12A to 12F are diagrams illustrating the relationship between deleted elements and the arrangement of elements kept in a memory module.
Figure 12B:
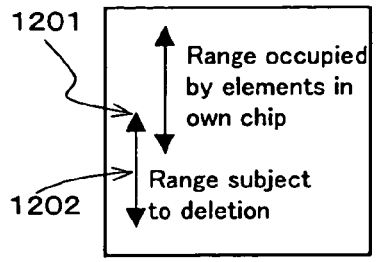

First, in the case in which the range to be deleted is after the range of elements kept by itself (see FIG. 11, "A" and FIG. 12A), the processor 36 performs no operation (see Step 1109). If the range to be deleted is at a position that overlaps the latter part of the elements kept by itself (see FIG. 11, "B" and FIG. 12B), then the processor 36 changes the allocated region size (Step 1110). To wit, the size of the allocated region is changed such that the area from the start of the range to be deleted (see arrow 1201) to the end of the range of elements kept in its own RAM core 34 (see arrow 1202) becomes garbage.

Figure 12E:
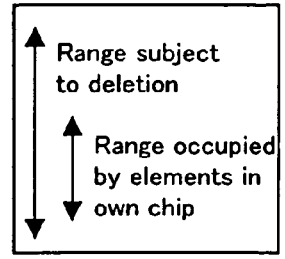
Figure 12C:
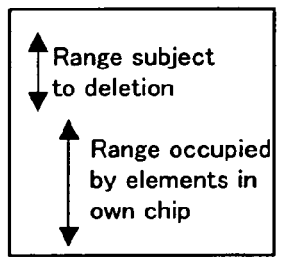
Figure 12F:
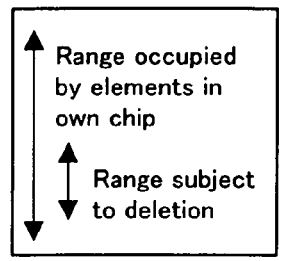
Figure 12D:
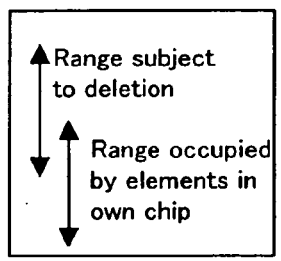

On the other hand, if the range to be deleted is before the range of elements kept by itself, (see FIG. 11, "C" and FIG. 12C), the processor 36 updates the logical start address so that the logical start address is decreased by the amount of the size requested for deletion (Step 1111). Moreover, if the range to be deleted is before the range of elements kept by itself and only part overlaps (see FIG. 11, "D" and FIG. 12D), then the processor 36 changes the logical start address to the value at the start of the range to be deleted and also changes the physical start address to the physical address corresponding to the end of the range to be deleted "+1" (Step 1112). Next, the processor 36 updates the size of the allocated region (Step 1113).

In addition, it the range to be deleted encompasses the range of elements kept by itself (see FIG. 11, "E" and FIG. 12E), the processor 36 deletes various data related to the space ID in question from the space ID control table (Step 1114 of FIG. 13). Finally, if the range to be deleted is encompassed within the range of elements kept by itself (see FIG. 11, "F" and FIG. 12F), the processor 36 divides the space ID control table into two, and may generate various data related to the portion in front of the deleted range and also generate various data related to the portion behind the deleted range (Step 1115). Alternately, the processor 36 may also perform garbage collection on its own RAM 34.

In this manner, the memory modules 14 operate in response to a single instruction (or space ID deletion instruction) from the CPU 12, so the required processing is performed in parallel in the stipulated memory modules.

Figure 14:
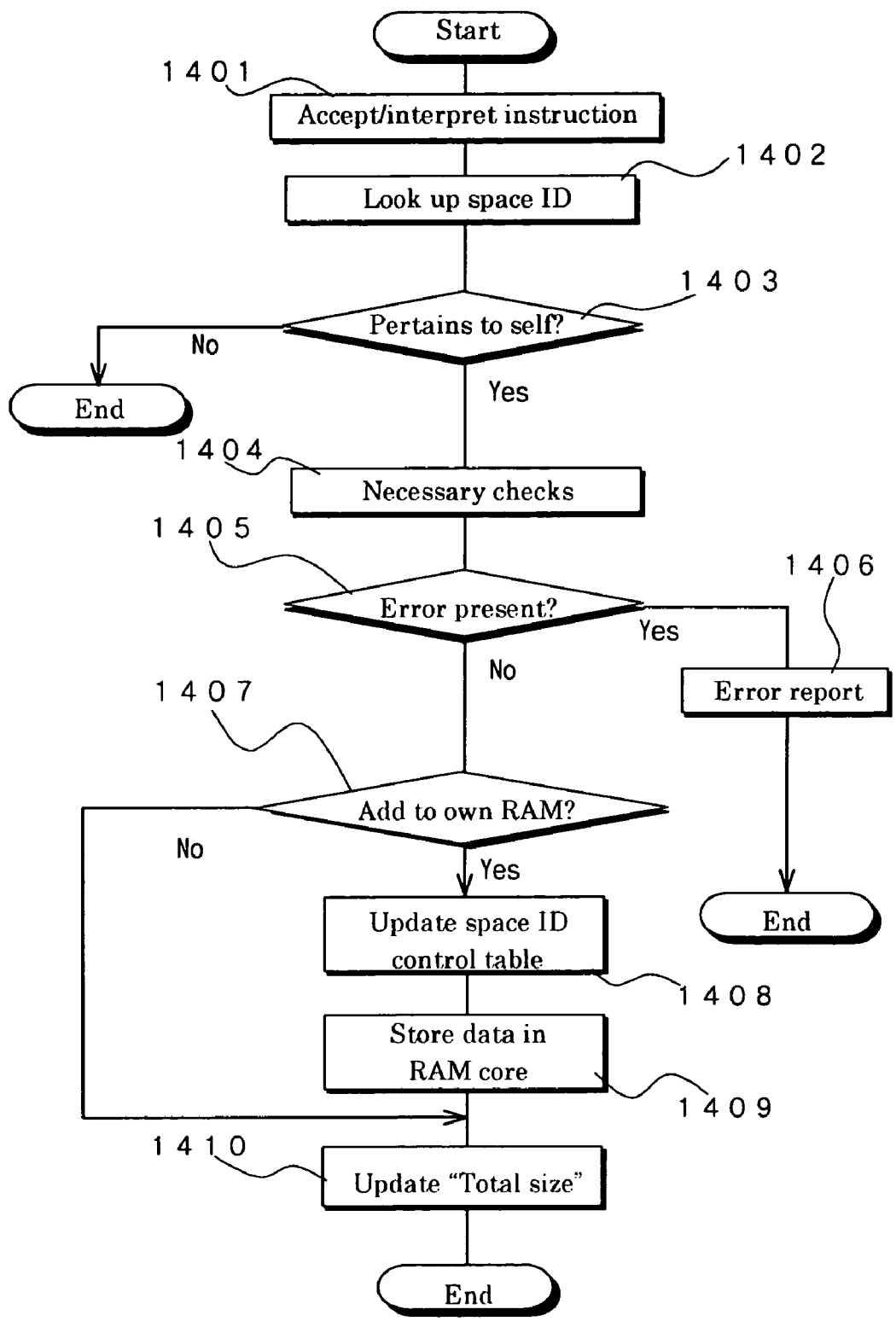
FIG. 14 is a flowchart showing the process executed in the various memory modules upon receiving an instruction to add elements to the end of a certain space ID.

Next, we shall briefly describe the case of adding certain elements to the end of an array having a certain ID. FIG. 14 is a flowchart showing the processing performed in the memory modules that receive the instruction to add an element to the end of an array having a certain space ID. Steps 1401 through 1406 of FIG. 14 correspond to Steps 1101 through 1106 of FIG. 11. Next, the processor 36 of each of the memory modules 14 determines whether or not the element to be added should be stored in its own RAM core 34 (Step 1407). This can be achieved by the processor 36 performing a lookup of its own space ID control table. If the result of Step 1407 is Yes, the required values are updated in the space ID control table (for example, the allocated region size is changed depending on the number of elements to be added), and next the element to be added is written to the stipulated region within the RAM cell (Step 1409). Alternately, various values of the space ID control table may be generated and the elements to be added may be written to the corresponding RAM cell.

Next, the processor 36 updates the value of the "total size" associated with the space ID in question within the space ID control table (Step 1410). Even if the result of Step 1407 is No, the value of the associated "total size" within the space ID control table is updated.

In the case in which elements are added at arbitrary positions within the array, a process similar to that of a delete request is performed in each of the memory modules 14.

[Specific Operations with Multi-Space Memory: Join or Divide Arrays]

Figure 15A:
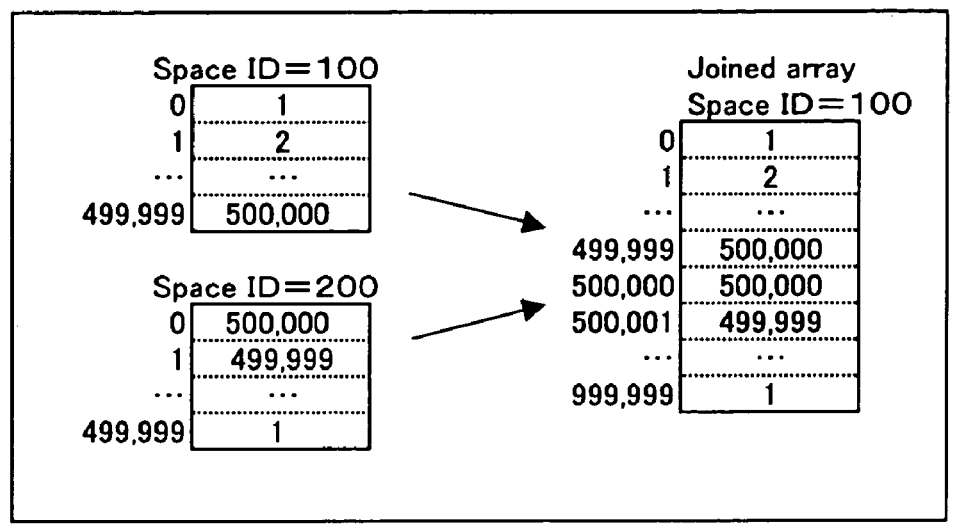
FIGS. 15A and 15B are diagrams used to describe the joining of arrays and division of arrays according to this embodiment.
Figure 15B:
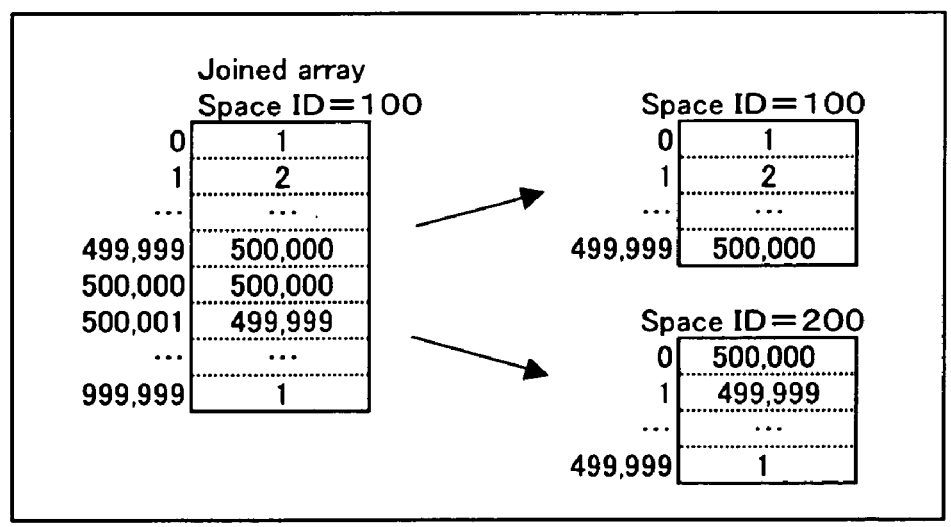

Next, we shall describe the case of joining multiple arrays as shown in FIG. 15A and the case of dividing a single array into multiple arrays as shown in FIG. 15B). In the computer system 10 according to this embodiment, an array having a certain space ID (space ID "100)" in FIG. 15A) and/or an array having another space ID (spice ID "100" in FIG. 15B) may be contained within the RAM cores of a single memory module or may be contained within the RAM cores of a plurality of memory modules.

FIGS. 16A and 16B are diagrams showing the state of an array having a space ID of "10" and an array having a space ID of "11," along with them stored in a memory module. The array 1501 with a space ID is "10" and the size of its various elements being 10 words is shown in FIG. 16A. The elements within this array 1501 are stored in memory modules 14-1 through 14-*x*. In addition, the array 1510 with a space ID is "11" and the size of its various elements being 10 words is shown in FIG. 16B. The elements within this array 1510 are stored in memory modules 14-1 through 14-*x*.

When the CPU 12 issues via the signal control line 25 an instruction to the effect of "join the array with a space ID of 10 and the array with a space ID of 11," each of the memory modules 14 receive it and determine whether or not it is a transaction related to the space ID of data kept by itself. This process is nearly identical to that of Steps 1101 through 1106 of FIG. 11.

Next, if the space ID of data kept by the processor itself pertains to the instruction, the processor of the memory module joins the arrays according to the following procedure.

Figure 17:
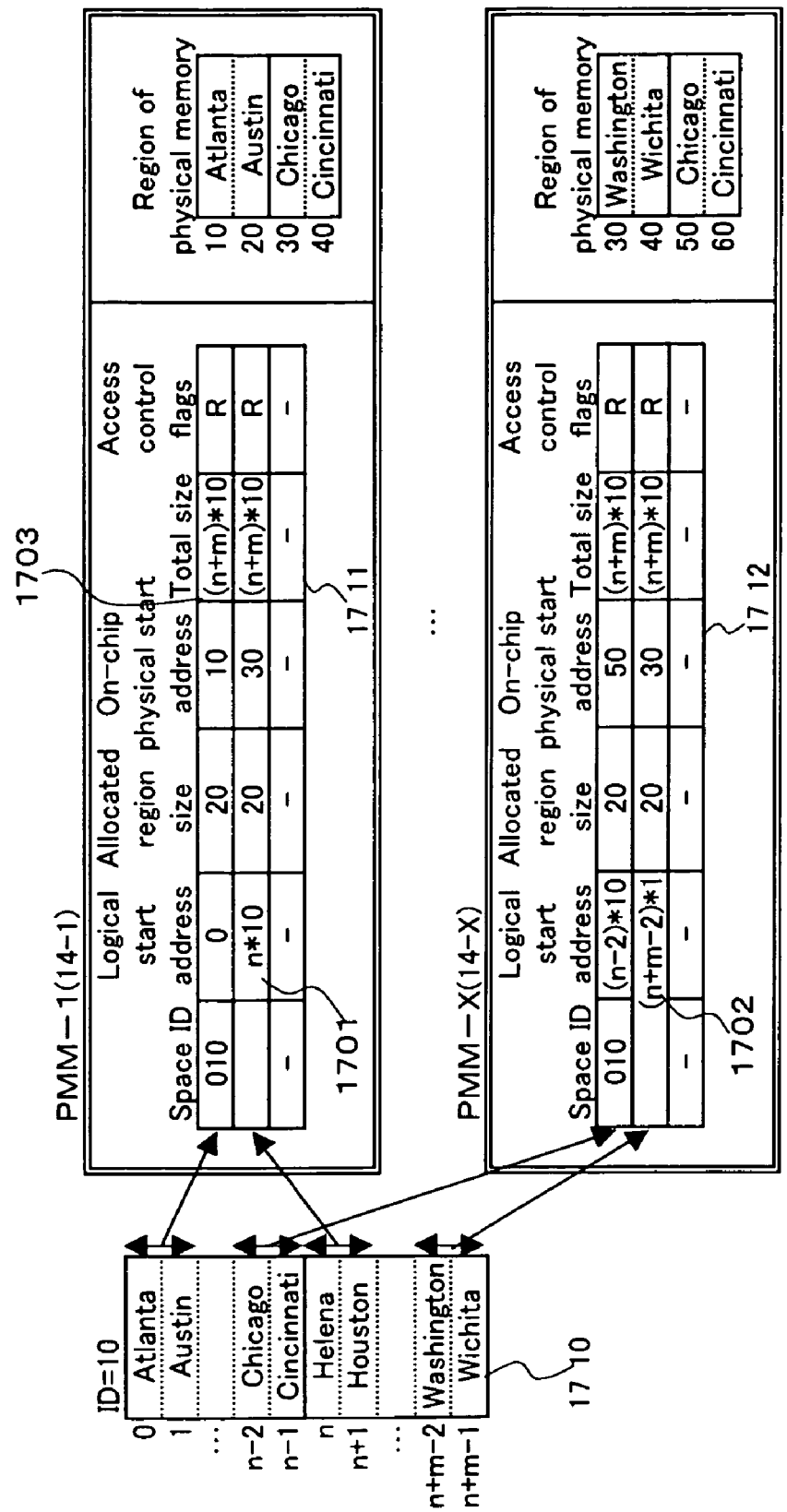
FIG. 17 is a figure showing an array obtained by the joining of arrays and a space ID control table in various memory modules in this embodiment.

In the case illustrated in FIG. 16 above, if the various pertinent memory modules 14 keep elements of both the space ID of "10" and the space ID of "11," the values of the space ID control table related to the space ID of "11" are updated. More specifically, a lookup of the value of the "total size" pertaining to the space ID of "10" is performed and its logical start address is recalculated (see 1701 and 1702 of FIG. 17, for example). In addition, the associated memory modules update the value of the "total size" within the space ID control table to one corresponding to the size of the two arrays combined (see 1703 of FIG. 17, for example). FIG. 17 is a figure showing the array 1710 thus obtained and the space ID control table the memory modules 14-1 through 14-*x*.

Figure 18:
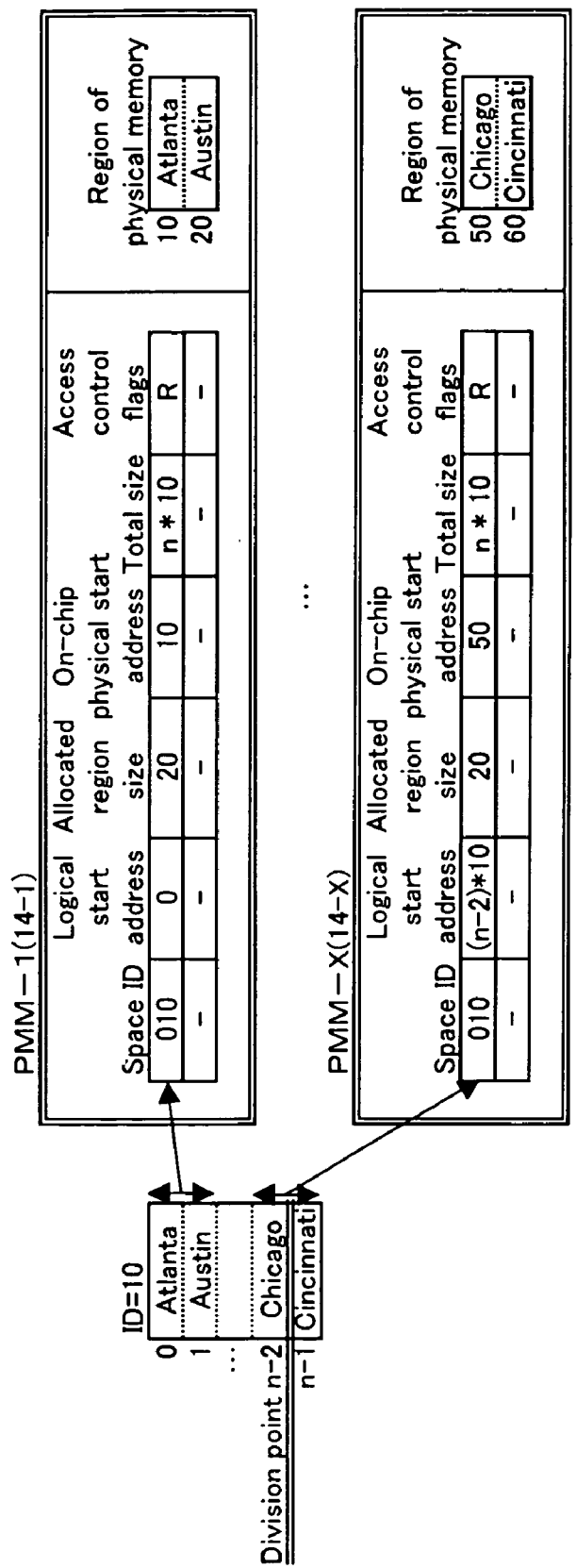
FIG. 18 is a diagram showing one example of an array having a space ID of "10" being divided into an array having a space ID of "10" and an array having a space ID of "11" in this embodiment.

FIG. 18 is a diagram showing one example of an array having a space ID of "10" being divided into an array having a space ID of "10" and an array having a space ID of "11" in this embodiment. The array division point in the array having a space ID of "10" shown in FIG. 18 is set such that the elements positioned before the division point are made into an array with the space ID of "10" while the elements positioned after the division point are made into an array with the space ID of "11."

Figure 19:
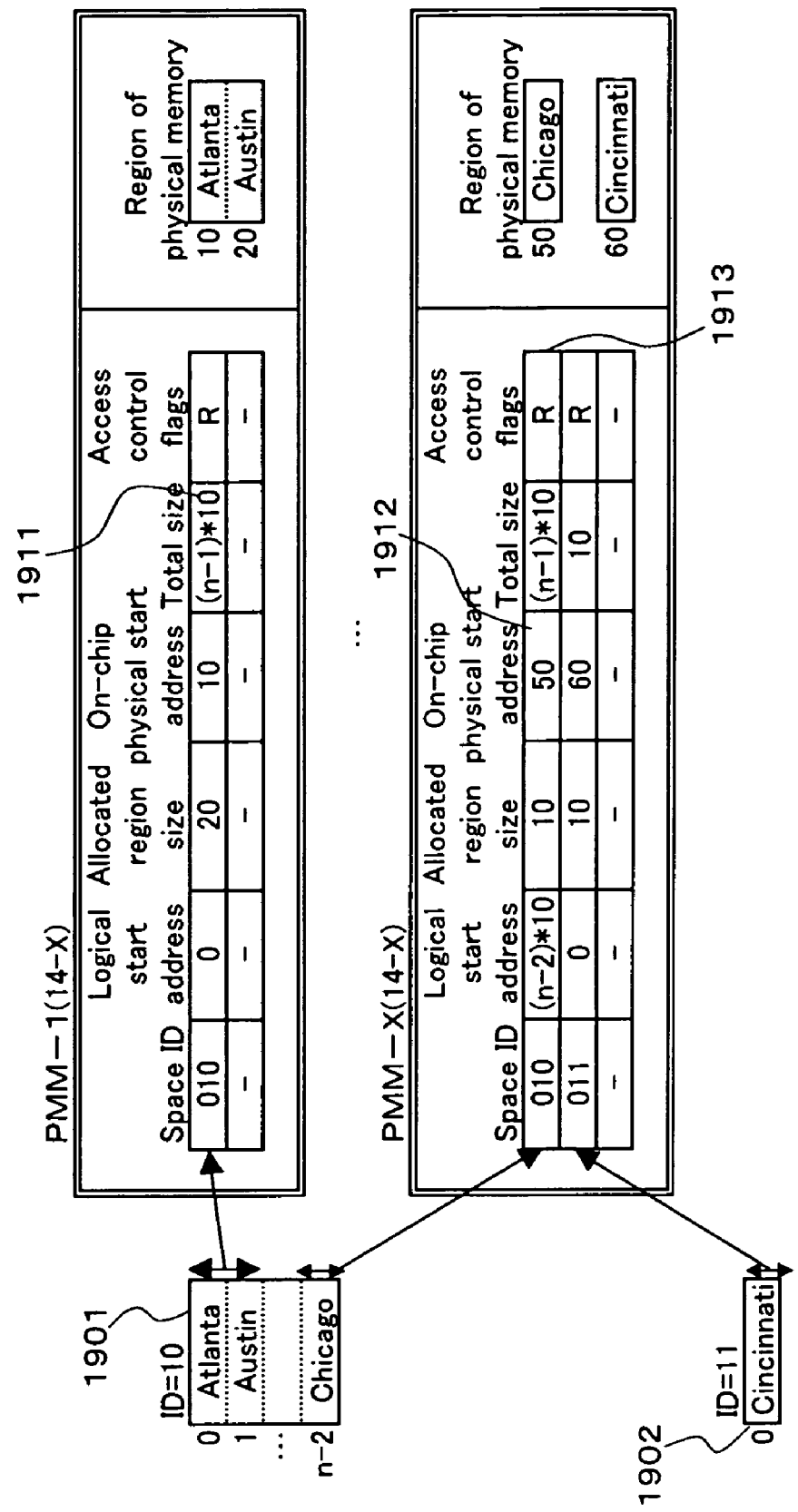
FIG. 19 is a figure showing an array obtained by the joining of arrays and a space ID control table in various memory modules in this embodiment.

In this case also, when the CPU 12 issues via the signal control line 25 an instruction to the effect of "divide the array with a space ID of 10 into an array with a space ID of 10 and an array with a space ID of 11 using the division point as a boundary," each of the memory modules 14 execute processing roughly corresponding to that of Steps 1101 through 1106 of FIG. 11, and among the memory modules, those pertaining to the instruction (in the example it FIG. 18, memory modules 14-1 through 14-x) execute the stipulated processing. For example, when storing the elements positioned after the division point, the processor 36 creates various values within the space ID control table pertaining to the space ID of "011" and also updates the values pertaining to total size among the space ID control table pertaining to the space ID of "010." In addition, when storing only the elements positioned before the division point, the processor updates the values pertaining to total size among the space ID control table pertaining to the space ID of "010." FIG. 19 is a diagram showing the arrays 1901 and 1902 thus obtained and the space ID control table in the memory modules 14-1 through 14-x (see 1911, 1912 and 1913, for example).

[Specific Operations with Multi-Space Memory: Parallel Copy]

Here follows a brief explanation of a parallel copy under a multi-space memory using a reconfigurable bus, depending on the case.

Figure 20:
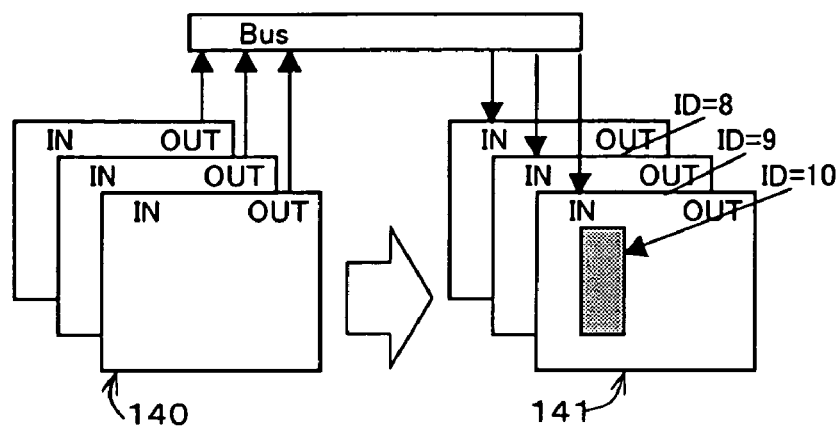
FIG. 20 is a diagram showing the parallel copying of data from one memory module group to another memory module group according to this embodiment.

For example, as shown in FIG. 20, with a single instruction from the CPU 12 it is possible to perform a parallel copy of data from one memory module group 140 to another memory module group 141. The following modes of parallel copying are conceivable.

(1) The case in which the one memory module group 140 contains a single memory module while the other memory module group contains a plurality of memory modules.

(2) The case in which the one memory module group 140 contains a plurality of memory modules while the other memory module group also contains a plurality of memory modules.

In the former case, the processor 36 of the memory module 14 containing the elements to be copied receives the CPU 12 via the signal control line 25 an instruction from (e.g., an instruction to copy stipulated elements within an array having a certain space ID as arrays with space IDs of 8, 9 and 10), and outputs the specified elements from the RAM core 34 to a stipulated bus. On the other hand, the processor 36 of the copy destination also responds to the receipt of the same instruction, receives the elements output from a bus and stores this in the stipulated region of the RAM core 34 and also updates its own space ID control table.

Regarding the latter case, it is possible to utilize a plurality of buses to copy data from each of the memory modules within the one memory module group 140 to corresponding memory modules of the other memory module group 141. In this case, it is sufficient for the CPU 12 to control the switches 28 and switches 30 so that the exchange of data between the stipulated memory modules is possible.

[Specific Operations with Multi-Space Memory: Hidden Updates, etc.]

Using the multi-space memory according to this embodiment, subscript conversion can be used to convert input subscripts and specify an array with the converted subscripts and also modify the values of array elements. When a certain process is completed and committed and subscript conversion or value modification is no longer necessary, the processors of the various memory modules can rewrite the space ID control table regarding the arrays in question and perform remapping and thus instantly resolve subscript conversion. On the other hand, the value modification itself takes time because it is necessary to update elements actually stored in the RAM core. Accordingly, in the memory modules, converted flags are provided and elements in which value modification is reflected are actually stored in the RAM core and then the flags corresponding to the elements are set to "1." By doing this, in a certain process, if the conversion flag is looked up and this is "1" then it is not necessary to obtain value modification, but on the other hand if the conversion flag is "0" then it is necessary to obtain value modification, so this can easily be known. Accordingly, a commit can be achieved essentially instantaneously.

Figure 21:
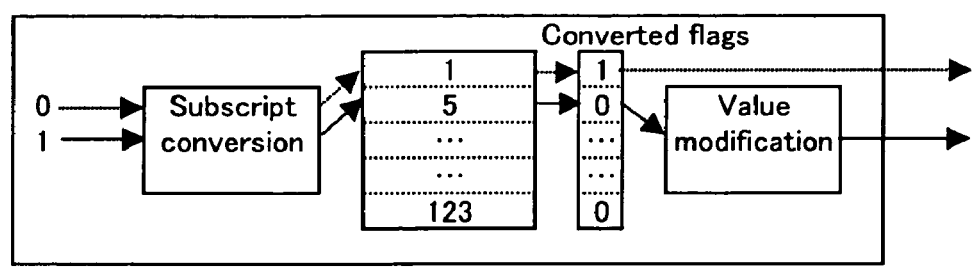
FIG. 21 is a diagram used to describe the use of converted flags according to this embodiment.
Figure 22:
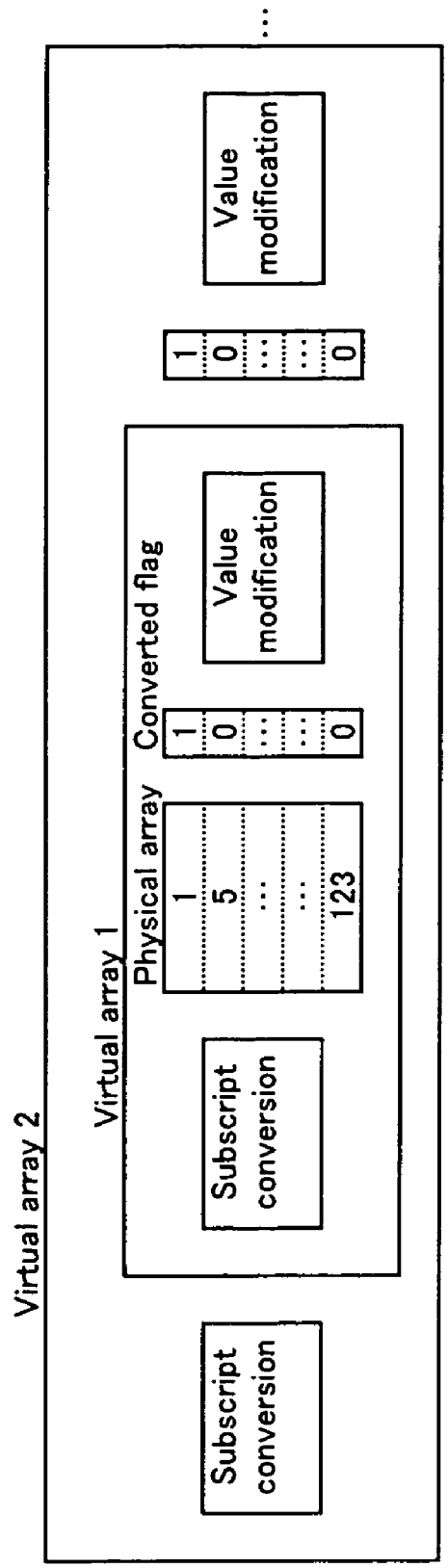
FIG. 22 is a diagram used to describe the use of converted flags according to this embodiment.

Moreover, by using the multi-space memory according to this embodiment, for the value modification of a nest structure such as that shown in FIG. 21, it is possible to provide converted flags and look up these converted flags to know whether it is necessary to obtain value modification.

[Use of Multi-Space Memory and Reconfigurable Buses: Sorting (1)]

In this embodiment, by using multi-space memory and reconfigurable buses, it is possible to perform parallel sort processing based on a single instruction from the CPU 12. Here follows a description of parallel sort processing in this embodiment.

Figure 23:
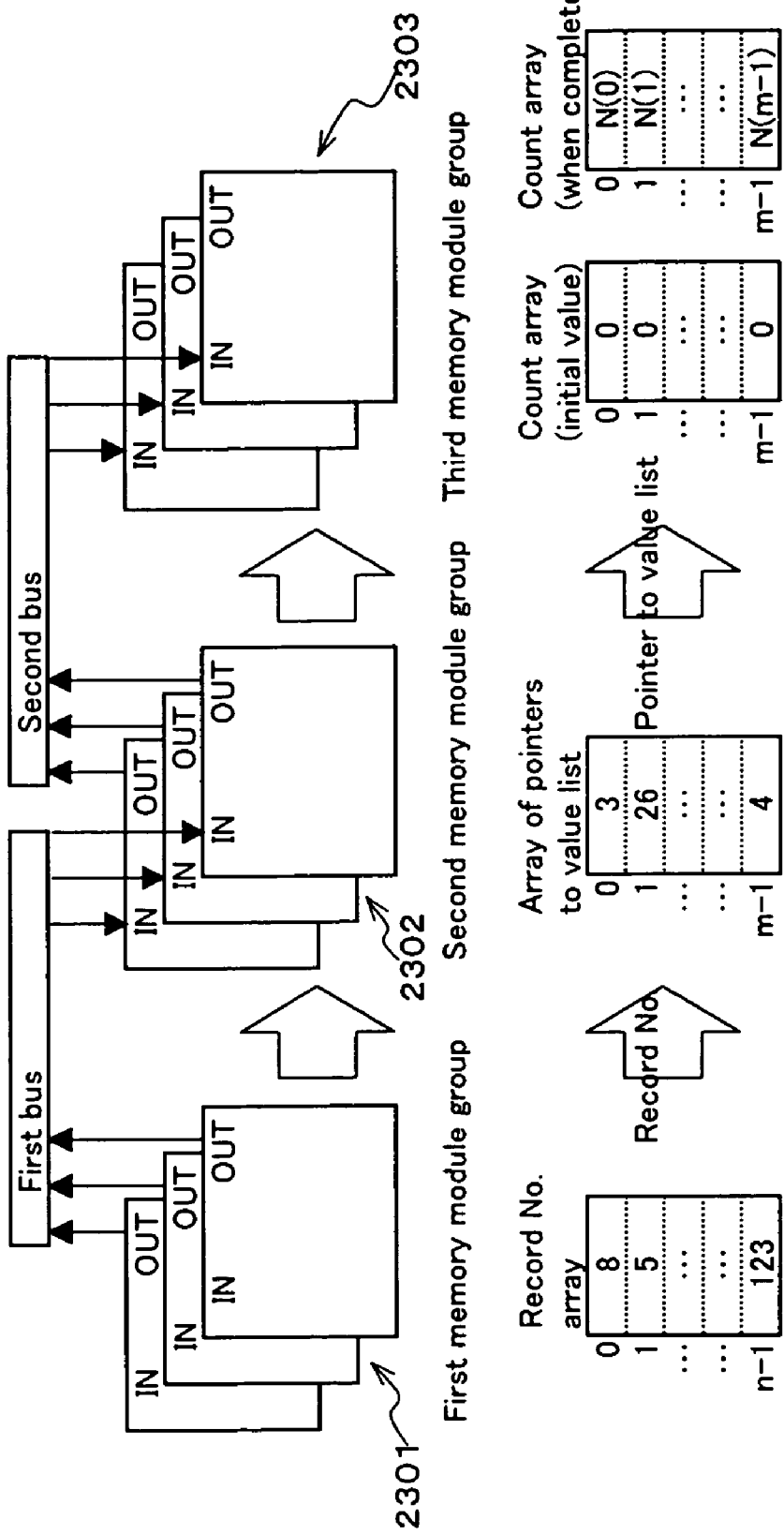
FIG. 23 is a diagram used to describe the flow of the sorting process according to this embodiment.
Figure 24:
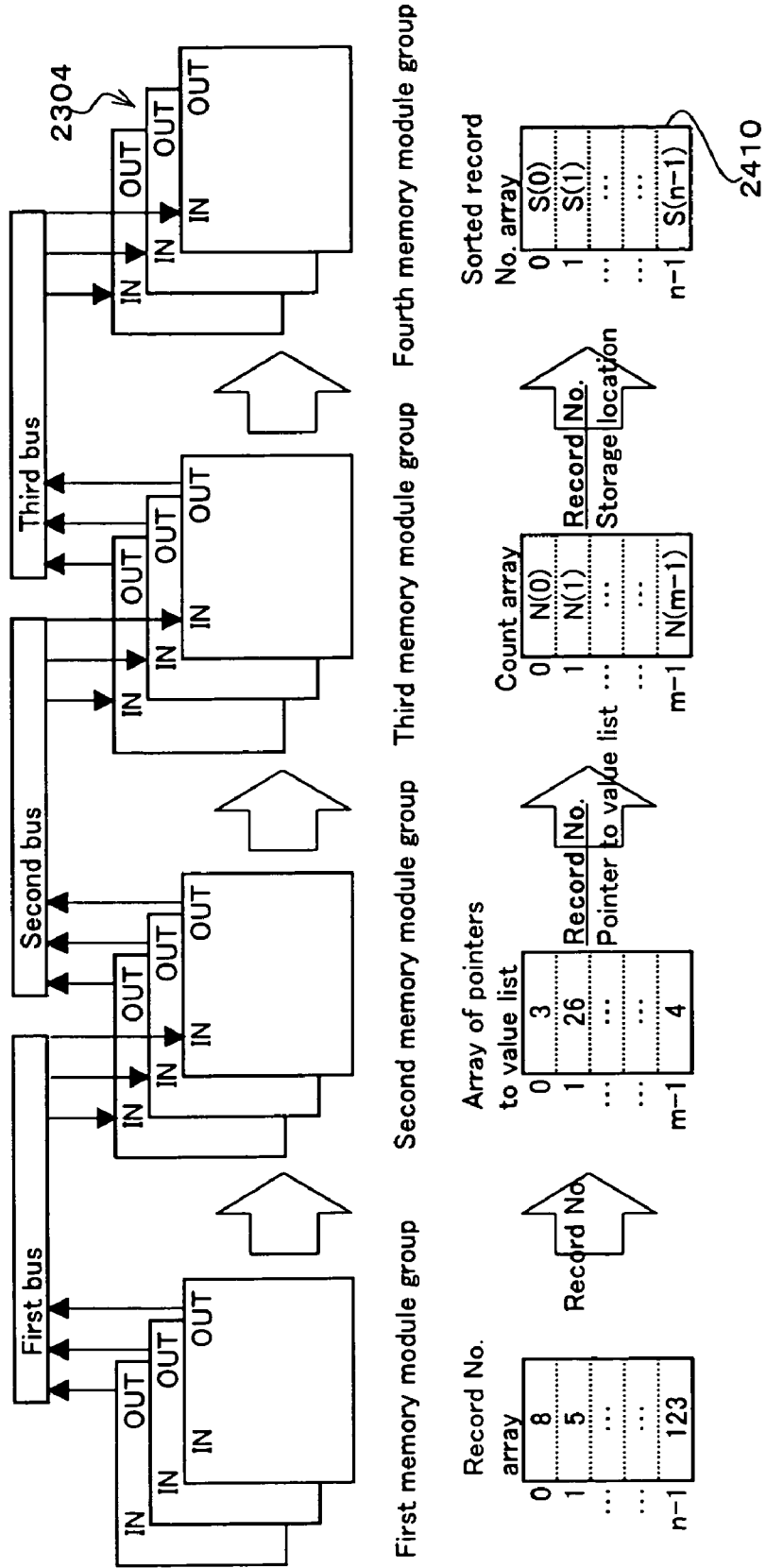
FIG. 24 is a diagram used to describe the flow of the sorting process according to this embodiment.

FIGS. 23 and 24 are diagrams used to describe the flow of the sorting process according to this embodiment. This sort processing can be broadly divided into the process shown in FIG. 23 (determining the count and calculating a total) and the process shown in FIG. 24 (transfer of record numbers).

In order to implement the sort processing according to this embodiment, this embodiment uses pointers to the value list with a constitution such that the record number array that contains record numbers, the value list that contains the actual values for a certain field, and the value (record number) from the record number array are used as input and pointer values that indicate the storage position in the corresponding value list is obtained as output. To wit, the record number is used to look up a pointer value to the value list at a corresponding position, and the actual field value is specified according to that pointer value (see FIG. 25).

First, when the CPU 12 gives the required instruction via the signal control line 25 to the memory modules 14, each memory module executes a process roughly equivalent to that of Steps 1101 through 1106 of FIG. 11. In addition, the CPU 12 controls switches 28 and 30 according to the notice from that memory module containing the record number among the associated memory modules so that the output of the series of memory modules containing the record number (the first memory module group 2301) is connected to a certain bus (called the "first bus").

Next, the CPU 12 controls switches 28 and 30 according to the notice from the that memory module containing the array of pointers to the value list so that the output of the series of memory modules containing the array of pointers to the value list (the second memory module group 2302) is connected to a certain bus (called the "second bus").

Furthermore, in another series of memory modules (the third memory module group 2303), a region is allocated for a "count array" having the same size (same number of elements) as the pointers to the value list, and each element is initialized to "0." Moreover, the input to the third memory module group is connected to the second bus above.

Next, record numbers are sent out on the first bus in order from the beginning of the record number array. This is achieved by the processor 36 in every memory module in the first memory module group 2301 performing a space ID control table lookup, detecting the timing when it is to output data on the first bus and sending the stipulated record number.

The record number is given via the first bus to each of the memory modules that make up the second memory module group 2302. The processor 36 of each memory module performs a lookup of its own space ID control table, detects the input of the record number associated to the array of pointers to the value list that it manages, and outputs a pointer value corresponding to the input in question to the second bus.

The pointer value is given via the second bus to each of the memory modules that make up the third memory module group 2302. The processor 36 of each memory module performs a lookup of its own space ID control table, detects the input of the pointer value associated to the array of pointers to the value list that it manages, and increments the element at the position in the count array corresponding to the pointer value. By repeating this operation, it is possible to know how many times the field value is being pointed to by the record number.

When the aforementioned series of processes for the count array is complete, a fixed region is allocated in a series of memory modules in order to create an array for storing the sorted record numbers. This series of memory modules is called the fourth memory module group 2304. The CPU 12 controls the switches 28 and 30 so that the output of the third memory module group used in the previous processing is connected to the input of the fourth memory module group via a bus (called the "third bus").

Once these preparations are complete, the sort process is performed. More specifically, starting from the beginning of the record number array, record numbers are given via the first bus to the memory modules that make up the second memory module group. In a stipulated memory module within the second memory module group, the processor 36 responds to the receipt of a record number by transmitting a pointer value to the third module group via the second bus.

Next, in a stipulated memory module among the third memory module group, the processor 36 performs a lookup of the pertinent count array based on the pointer value and determines the storage position for the record number. Thereby, the record number and its storage position are sent from the memory module in question over the third bus. Accordingly, in the stipulated memory module of the fourth memory module group, the processor 36 places the record number at the stipulated storage location. By repeating this process, it is possible to create a sorted record number array (2410 in FIG. 24) in the fourth memory module group.

For example, the process shown in FIG. 23 can be pipelined. To wit, when a certain record number p is transferred over the first bus, the pointer value P(p-1) pertaining to record number p-1 can be transferred over the second bus. In addition, the process shown in FIG. 24 can be similarly pipelined. In this case also, when a certain record number p is transferred over the first bus, the pointer value P(p-1) pertaining to record number p-1 can be transferred over the second bus. Moreover, the storage position pertaining to record number p-1 can be transferred over the third bus at the same timing.

The following results are obtained regarding the processing time for such pipelined processes. First, regarding the processing of FIG. 23, the first through fourth buses are each assumed to be 128 bit, so each has a bandwidth of 12.8 GB/second, and the record numbers and pointer values are each assumed to be 32-bit integers. Now, in the case of 1 billion records, the aforementioned processing involves the transfer of 4 billion bytes of data, but we found that if pipelined processing is performed the processing may be completed in 4 G/12.8 G=0.3125 seconds.

Similarly, regarding the processing of FIG. 24, assuming a similar bandwidth and data size, in the case of 1 billion records, the transfer of 8 billion bytes of data is necessary, so we found that if pipelined processing, is performed the processing may be completed in 8 G/12.8 G=0.625 seconds.

[Use of Multi-Space Memory and Reconfigurable Buses: Sorting (2)]

Figure 26:
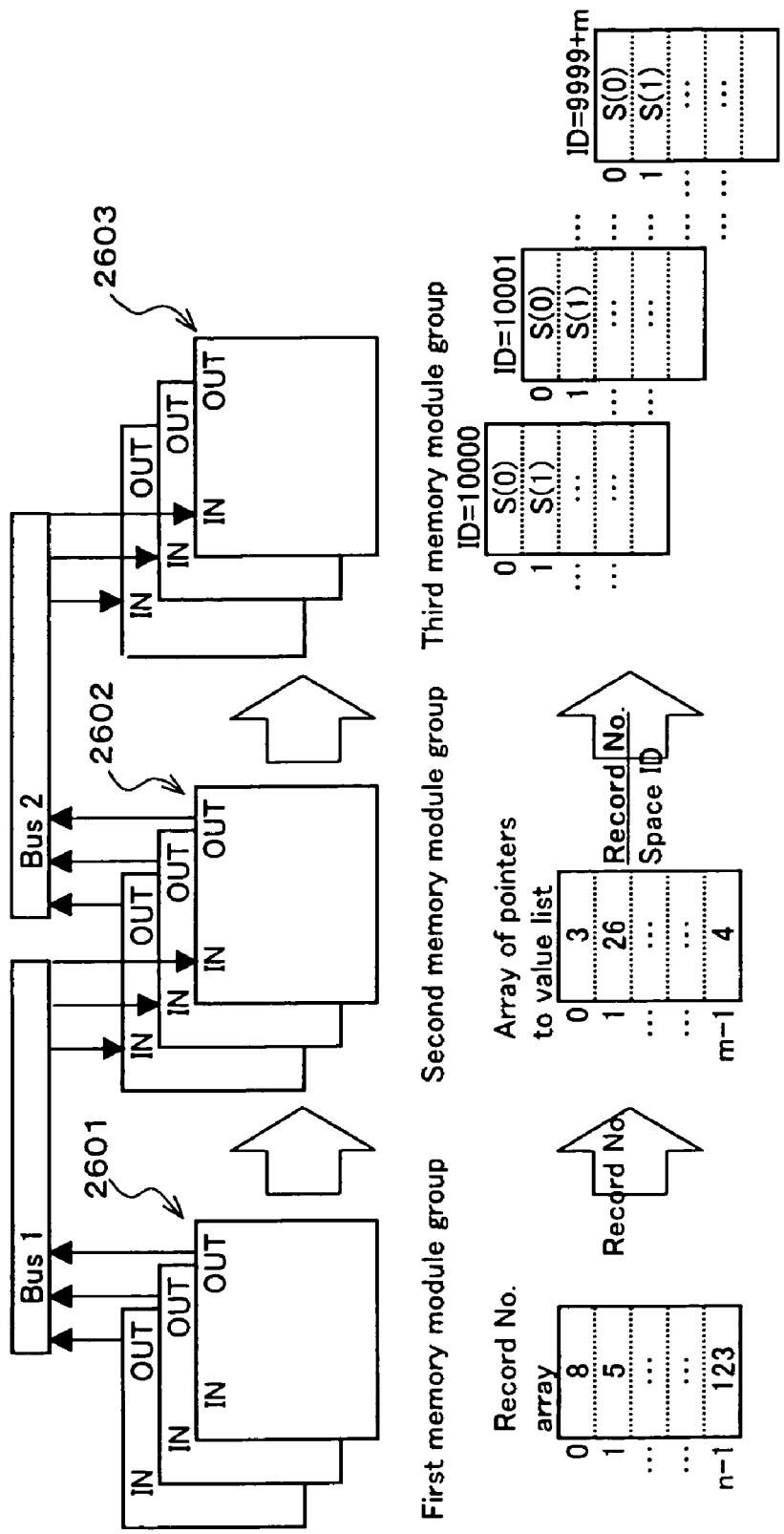
FIG. 26 is a diagram used to describe the flow of another sorting process according to this embodiment.

Next, we shall briefly describe sorting by another technique. In this sorting also, the output of the first memory module group (see 2601 of FIG. 26) consisting of memory modules that contain the record number array is connected to the first bus and the input of the second memory module group 2602 consisting of memory modules that store the array of pointers to the value list is connected to the first bus. Thereby, the output of the first memory module group 2601 can be transmitted to the second memory module group 2602 via the first bus.

On the other hand, a region for an array having the same number of space ID's as the second memory module group 2602 is allocated in the third memory module group 2603 and also the output of the second memory module group 2602 is connected to the input of the third memory module group 2603 via the second bus.

Next, in the first memory module group 2601, when the processor 36 of the memory module that contains a certain record number sends the record number in question over the first bus, in the stipulated memory module of the second memory module group 2602, the processor 36 responds to its receipt and calculates the space ID from the corresponding pointer value and sends the record number and space ID over the second bus.

In the third memory module group, based on the space ID and record number in question, the stipulated memory module 36 is started up and the record number given is placed at the end of the array having the space ID in question. Once this process is executed for all record numbers, in the third memory module group, the processor 36 of each memory module executes the process for joining the arrays that it has. High-speed sorting can be achieved by this technique also.

[Use of Multi-Space Memory and Reconfigurable Buses: Searching (1)]

In addition, in this embodiment, by using multi-space memory and reconfigurable buses, it is possible to perform parallel searching based on a single instruction from the CPU 12.

Figure 25:
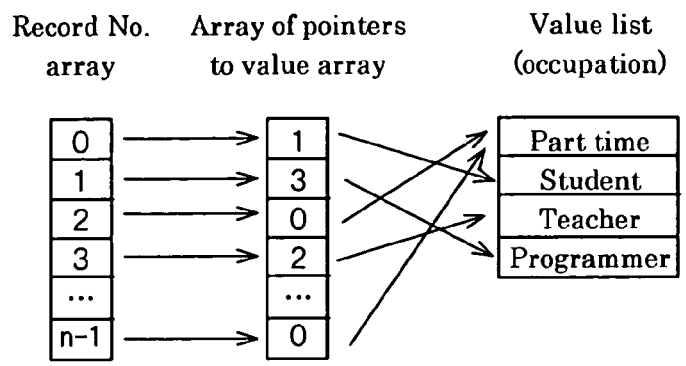
FIG. 25 is a diagram showing the data lookup procedure wherein a field value is determined from the record number according to this embodiment.
Figure 27:
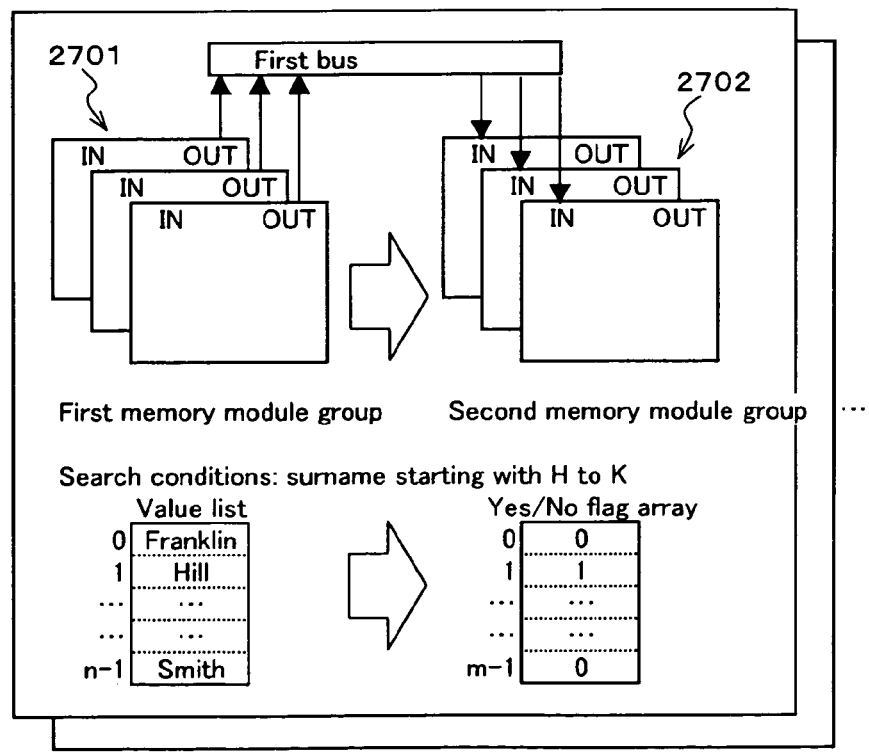
FIG. 27 is a diagram used to describe the flow of the search process according to this embodiment.
Figure 28:
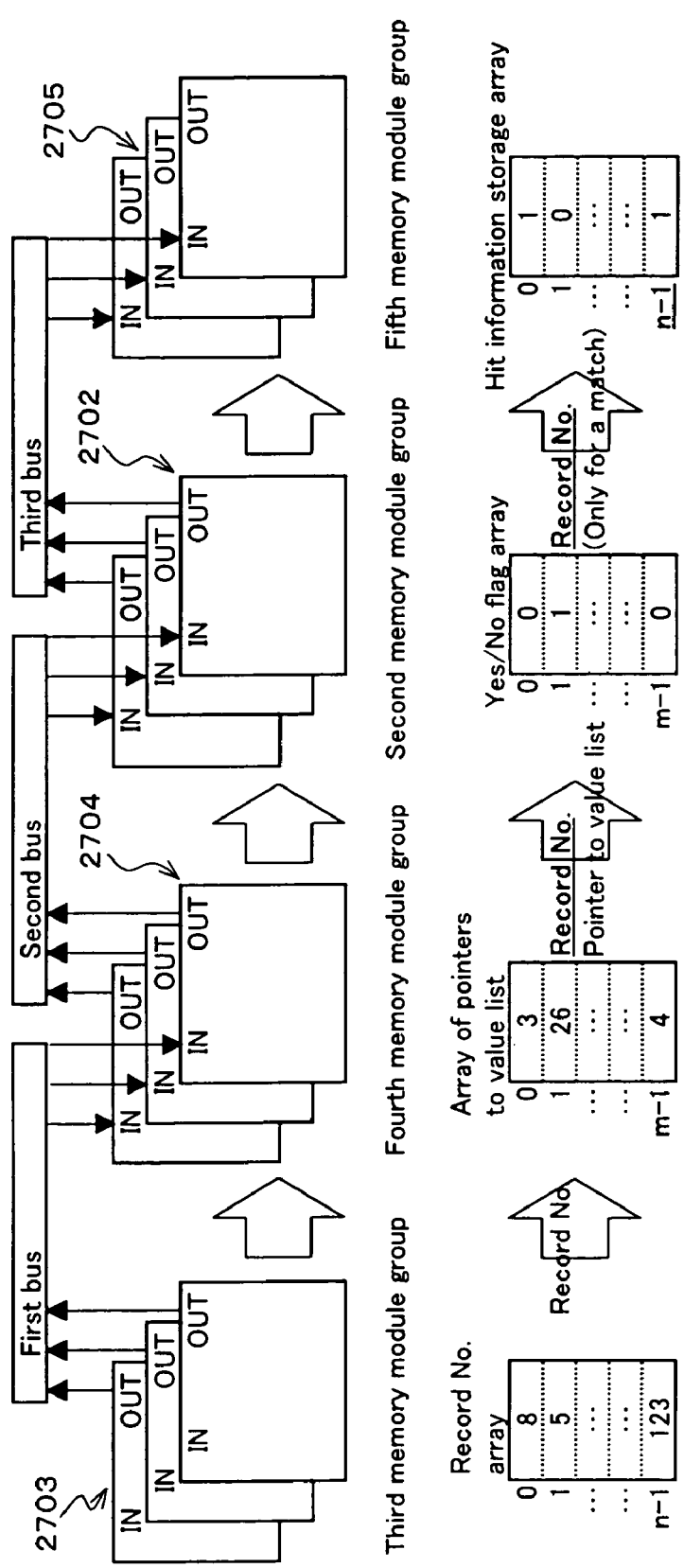
FIG. 28 is a diagram used to describe the flow of the search process according to this embodiment.

FIGS. 27 and 28 are diagrams used to describe the flow of the searching process according to this embodiment. For this searching, a record number array, array of pointers to a value list, value list and yes/no flag array and the like are used. Accordingly, in this example also, as shown in FIG. 25, the values are looked up in the order record number, pointer value, field value.

First, when the CPU 12 gives the required instruction via the signal control line 25 to the memory modules 14, each memory module executes a process roughly equivalent to that of Steps 1101 through 1106 of FIG. 11. In addition, the CPU 12 controls switches 28 and 30 according to the notice from that memory module containing the record number among the associated memory modules so that the output of the series of memory modules containing the record number (the first memory module group 2701) is connected to a certain bus (called the "first bus"). Furthermore, a region is allocated in a series of memory modules (the second memory module group 2702), for the yes/no flag array having the same number of elements as the value list, and the processor 36 of each memory module belonging to the second memory module group 2702 in question initializes each element in the region to "0."

Next, the input of the second memory module group 2702 is connected to the first bus. Then, in accordance with search conditions given by the CPU 12, the processor 36 in each memory module of the second memory module group performs a lookup for the field values that meet the search conditions within the value list, and sets the corresponding values in the yes/no flag array to "1." For example, if the search conditions are a range, then it is sufficient to use the binary tree method or the like. In addition, in case of other conditions, then matches may be judged for each element.

Once this process is complete, the search is executed. First, the CPU 12 controls the switches 28 and 30 so that the output of a series of memory modules that contain the record number array (the third memory module group 2703) is connected to the first bus and the input of a series of memory modules that contain the array of pointers to the value list (the fourth memory module group 2704) is connected to the first bus. In addition, the CPU 12 controls the switches 28 and 30 so that the output of the fourth memory module group 2704 and the input of the second memory module group 2702 are connected to the second bus.

Moreover, a region for an array having the same number of elements as the record numbers is allocated in a series of memory modules (the fifth memory module group 2705) and the CPU 12 controls the switches 28 and 30 so that its input and the output of the second memory module group 2702 are connected via the third bus.

After this process, record numbers are sent out on the first bus in order from the beginning of the record number array. This is achieved by the processor 36 in every memory module in the third memory module group 2703 performing a space ID control table lookup, detecting the timing when it is to output data on the first bus and sending the stipulated record number.

The record number is given via the first bus to each of the memory modules that make up the fourth memory module group 2704. The processor 36 of each memory module performs a lookup of its own space ID control table, detects the input of the record number associated to the array of pointers to the value list that it manages, and outputs a pointer value corresponding to the received record number and input in question to the second bus.

The pointer value is given via the second bus to each of the memory modules that make up the third memory module group. The processor 36 of each memory module performs a lookup of its own space ID control table, detects the input of the pointer value indicating the same position as the position in the yes/no flag array that it manages, and determines whether the yes/no flag indicating the pointer value in question is "0" or "1." Next, if the yes/no flag is "1" then the pertinent record number is given to the fifth memory module group 2705 via the third bus.

In the fifth memory module group 2705, the processor 36 of each memory module in the fifth memory module group 2705 performs a lookup of its own space ID control table, detects the input of a record number indicating the same position as the position in the hit information storage array that it manages, and sets the element for that position to "1." By repeating this process for the stipulated record number, the search is completed by extracting the elements that are "1" in the hit information storage array.

In the same manner as the sorting, the aforementioned searching can also be implemented by means of the pipelined processing of the process described in reference to FIG. 27 and the process described in reference to FIG. 28. The following results were obtained regarding the processing time for the pipelined processing of searching.

Assuming that the bus bandwidth and bit length of the various elements are the same as in the sorting, in the case of 1 billion records, the transfer of 8 billion bytes of data is necessary, so we found that if pipelined processing is performed the processing may be completed in 8 G/12.8 G=0.624 seconds.

Moreover, if this search process is used, it is possible to achieve searches on multiple fields using a combination of AND, OR or NOT or other Boolean logic. More specifically, it is sufficient to create a hit information storage array for each field and then perform Boolean operations among the elements of these fields.

For example, in an AND or OR search on two fields, the transfer of elements of the hit information storage array (1 billion bytes) is performed. Accordingly, one can see that this would require processing time of (10 G/8)/12.8 G=0.098.

Moreover, in order to achieve even higher speeds, it is sufficient to connect in parallel memory module groups that execute two search processes. In addition, by placing the arrays such that the fourth memory module group and second memory module group can be constituted with the same plurality of memory modules, it would be possible to eliminate bottlenecks and thus achieve roughly twice the processing speed.

The present invention is in no way limited to the aforementioned embodiments, as various modifications are possible within the scope of the claims, and it need not be said that these are still included within the scope of the present invention.

For example, while the present invention was applied to a computer system in the aforementioned embodiments, but this is not a limitation, as it may also be applied to a computer board that can be connected to a personal computer or the like. In this case, in FIG. 1, the CPU 12, memory units 14, bus 24 and the like may be mounted upon the board, thereby constituting an information processing unit according to the present invention.

In addition, the number of sets of buses that connect the CPU 12 and memory modules 14, and/or the memory modules 14 to each other is not limited to those in the aforementioned embodiments, but rather this number may be determined appropriately in consideration of the size of the circuit board on which the computer system is mounted, the bit width of the various buses and the like. In addition, in the aforementioned embodiment, switches 28 for setting the connections between memory module input/output and the buses and switches 30 that are able to switch buses between the CPU and memory modules and among memory modules are provided. By providing switches 30, for example, a certain bus (see bus 24-4 of FIG. 1) can be used for both the exchange of data between the CPU module 12 and memory module 14-1, it can also be used for the exchange of data between memory module 14-2 and memory module 14-3 (in this case, it is sufficient to turn switch 30-5 off). Accordingly, the buses can be utilized effectively. However, in the case in which the number of sets of buses can be made large enough, or in the case that the number of memory modules is relatively few, the switches 30 need not necessarily be provided.

In addition, this Specification recites that the instructions from the CPU 12 are given via the signal control line 25, but in addition to the instructions, naturally clock signals or various other control signals for making the various memory modules to operate synchronously may also be given via the signal control line 25, and also stipulated signals from the various memory modules to the CPU 12 (for example, error signals and signals that indicate the receipt of data) may be given.

Moreover, in this Specification, the function of one means may be implemented by two or more physical means, or the functions of two or more means may be implemented by one physical means.

By means of the present invention, it is possible to provide a distributed memory type computer architecture wherein the input/output of elements to arrays stored in various memories can be achieved with a single instruction, and also extremely high speed parallel processing can be achieved.

FIELD OF THE INVENTION

The present invention is usable in systems that handle large amounts of data, for example, databases and data warehouses. More specifically, it is usable in large-scale scientific and technical calculation, control systems for plants and power supply and the like, and to order management and the management of mission-critical clerical work such as securities trading.

What is claimed is:

1. A computer system having architecture of a parallel computer, comprising:
    a CPU module;
    a plurality of memory modules, each having a processor and RAM core; and
    a plurality of sets of buses that make (a) connections between the CPU module and memory modules or (b) connections among memory modules, or that make (a) and (b), wherein the processors of the plurality of memory modules operate on an instruction given by the CPU module to the processors of the memory modules, and wherein
    said architecture of a parallel computer manages at least one series of data having a stipulated relationship, each series of data being given a space ID, and the processor of each memory module manages a table that contains one or more sets of said space ID, the logical address of a portion of the series of data managed, the size of said portion and the size of the series of data, in which said processor of each memory module manages said portion of series of data such that said series of data is divided among the plurality of memory modules and,
    in response to an instruction including the space ID and the logical address from the CPU module, the processor of each memory module determines if the portion of the series of data managed is involved in the received instruction by reviewing the space ID and the logical address, reads data stored in the RAM core and sends data out on a bus, writes data given via the bus to the RAM core, performs (c) the necessary processing on the data or (d) updates said table, or performs (c) and (d).

2. The computer system according to claim 1, wherein said processor has:
    a space comparator that compares the space ID given by the CPU against the space ID of one or more series of data managed;
    an address comparator that compares the logical address given by the CPU against the logical address of the portion of the data managed; and
    an address calculator that calculates the physical address in a respective RAM cell based on said logical address.

3. The computer system according to claim 1, wherein each of said memory modules receives a synchronization signal for achieving synchronization with the CPU module and other memory modules, and each of said memory modules further comprises input that is connectable to any of said plurality of sets of buses, and output that is connectable to any other of said plurality of sets of buses, and at least, each of said memory modules is able to output data according to said synchronization signal by connecting the input to one of said buses, inputting data and connecting the output to any of said other buses.

4. The computer system according to claim 3, wherein switches are provided on each of said sets of buses, thereby controlling (e) the connections between said CPU module and the input or output of any of the memory modules or controlling (f) connections between the input and output of one memory module and the output and input of another memory module, or controlling (e) and (f), and
    by switching said switches, the exchange of parallel data is achieved in each of said sets of buses.

5. The computer system according to claim 4, wherein the output of one memory module is connected to the input of another memory module via a first bus which is one of said plurality of sets of buses, and the output of said other memory module is connected to the input of still another memory module via a second bus which is another one of said plurality of sets of buses so the exchange of data over the first bus proceeds in parallel with the exchange of data over the second bus.

6. The computer system according to claim 5, wherein connections between each bus and memory module are repeated to form multi-stage connections among memory modules.

7. The computer system according to claim 1, wherein, when said processor receives an instruction to delete a specific element within a series of data, insert a specific element into said series of data, or add a specific element to the end of a series of data, said processor performs a table lookup, compares the region of data managed against the position of said element subject to deletion, insertion or addition, and based on the results of said comparison, updates the content of said table.

8. The computer system according to claim 1, wherein, in response to a given instruction, said processor (e) converts subscripts for specifying elements within a series of data or (f) executes value conversion for giving a specific modification to elements, or said processor performs (e) and (f).

9. An information processing unit comprising:
    a CPU module;
    a plurality of memory modules, each having a processor and RAM core; and
    a plurality of sets of buses that make (a) connections between the CPU module and memory modules or (b) connections among memory modules, or that make (a) and (b), wherein the processors of the plurality of memory modules operate on an instruction given by the CPU module to the processors of the memory modules, and wherein
    said information processing unit has architecture of a parallel computer manages at least one series of data having a stipulated relationship, each series of data being given a space ID and the processor of each memory module manages a table that contains one or more sets of said space ID, the logical address of a portion of the series of data managed, the size of said portion and the size of the series of data, in which said processor of each memory module manages said portion of series of data such that said series of data is divided among the plurality of memory modules and, in response to an instruction including the space ID and the logical address from the CPU module, the processor of each memory module determines if the portion of the series of data managed is involved in the received instruction by reviewing the space ID and the logical address, reads data stored in the RAM core and sends data out on a bus, writes data given via the bus to the RAM core, performs (c) the necessary processing on the data or (d) updates said table, or performs (c) and (d).

10. The information processing unit according to claim 9, wherein said CPU module is constituted to link to another bus that connects legacy memory, input devices and display devices to each other.

11. A computer system comprising the information processing unit according to claim 9 and one or more storage devices including legacy memory, input devices and display devices linked to the CPU module via another bus.

12. The computer system according to claim 1, wherein the plurality of sets of buses are connected in parallel between memory modules.

13. The computer system according to claim 9, wherein the plurality of sets of buses are connected in parallel between memory modules.

* * * * *